(12) United States Patent
Cregg et al.

(10) Patent No.: US 10,181,902 B2
(45) Date of Patent: Jan. 15, 2019

(54) MULTI-MEDIA COMMUNICATION DEVICE

(71) Applicant: SmartLabs, Inc., Irvine, CA (US)

(72) Inventors: Daniel Brian Cregg, Newport Beach, CA (US); Joseph J. Dada, Newport Beach, CA (US)

(73) Assignee: SmartLabs, Inc., Irvine, CA (US)

( * ) Notice: Subject to any disclaimer, the term of this patent is extended or adjusted under 35 U.S.C. 154(b) by 0 days.

(21) Appl. No.: 15/808,356

(22) Filed: Nov. 9, 2017

(65) Prior Publication Data

US 2018/0159625 A1 Jun. 7, 2018

Related U.S. Application Data

(63) Continuation of application No. 15/668,168, filed on Aug. 3, 2017, which is a continuation of application No. 15/187,010, filed on Jun. 20, 2016, now Pat. No. 9,755,744, which is a continuation of application No. 14/952,147, filed on Nov. 25, 2015, now Pat. No. 9,401,763, which is a continuation of application No. 13/920,894, filed on Jun. 18, 2013, now Pat. No. 9,232,615.

(60) Provisional application No. 61/661,722, filed on Jul. 3, 2012.

(51) Int. Cl.
| | |
|---|---|
| *H05B 37/02* | (2006.01) |
| *H04B 10/116* | (2013.01) |
| *H04L 12/26* | (2006.01) |
| *H04W 24/08* | (2009.01) |
| *H05B 33/08* | (2006.01) |

(52) U.S. Cl.
CPC ............ *H04B 10/116* (2013.01); *H04L 43/16* (2013.01); *H04W 24/08* (2013.01); *H05B 33/0815* (2013.01); *H05B 33/0845* (2013.01); *H05B 37/0263* (2013.01); *H05B 37/0272* (2013.01)

(58) Field of Classification Search
None
See application file for complete search history.

(56) References Cited

U.S. PATENT DOCUMENTS

| | | | |
|---|---|---|---|
| 5,090,024 | A | 2/1992 | Vander Mey et al. |
| 5,726,644 | A | 3/1998 | Jednacz et al. |
| 5,754,754 | A | 5/1998 | Dudley et al. |
| 6,031,818 | A | 2/2000 | Lo et al. |
| 6,636,488 | B1 | 10/2003 | Varma |
| 6,693,907 | B1 | 2/2004 | Wesley et al. |

(Continued)

FOREIGN PATENT DOCUMENTS

| | | |
|---|---|---|
| IN | 289091 | 11/2017 |
| MY | 158614 A | 10/2016 |

(Continued)

OTHER PUBLICATIONS

Insteon—White Paper: The Details, INSTEON, 2013.

(Continued)

*Primary Examiner* — Jeffery S Zweizig
(74) *Attorney, Agent, or Firm* — Knobbe, Martens, Olson & Bear, LLP

(57) ABSTRACT

An LED illumination device is configured to receive coded messages by at least one of radio signals in free space, electrically conducted signals by wire, and light wave propagated signals in free space, process the coded messages, and transmit the coded messages by two or more of radio signals in free space, electrically conducted signals by wire, and light wave propagated signals in free space.

19 Claims, 18 Drawing Sheets

(56) References Cited

U.S. PATENT DOCUMENTS

| | | |
|---|---|---|
| 6,918,077 B2 | 7/2005 | Fukushima et al. |
| 7,046,642 B1 | 5/2006 | Cheng et al. |
| 7,069,490 B2 | 6/2006 | Niu et al. |
| 7,233,573 B2 | 6/2007 | Walls et al. |
| 7,286,511 B2 | 10/2007 | Zhong et al. |
| 7,345,998 B2 | 3/2008 | Cregg et al. |
| 7,663,502 B2 | 2/2010 | Breed |
| 7,904,187 B2 | 3/2011 | Hoffberg |
| 8,013,545 B2 | 9/2011 | Jonsson |
| 8,081,649 B2 | 12/2011 | Cregg et al. |
| 8,190,275 B2 | 5/2012 | Chang |
| 8,301,180 B1 | 10/2012 | Gailloux |
| 8,427,076 B2 | 4/2013 | Bourquin et al. |
| 8,495,244 B2 | 7/2013 | Bonar |
| 8,516,087 B2 | 8/2013 | Wilson |
| 8,610,305 B2 | 12/2013 | Sarid |
| 8,619,819 B2 | 12/2013 | Seelman |
| 8,653,935 B2 | 2/2014 | Baker |
| 8,804,584 B2 | 8/2014 | Stewart |
| 8,918,461 B2 | 12/2014 | Rimmer et al. |
| 8,935,533 B2 | 1/2015 | Kim et al. |
| 9,014,067 B2 | 4/2015 | Chun |
| 9,014,708 B2 | 4/2015 | He et al. |
| 9,054,892 B2 | 6/2015 | Lamb |
| 9,071,453 B2 | 6/2015 | Shoemaker |
| 9,078,087 B2 | 7/2015 | Yoon |
| 9,081,501 B2 | 7/2015 | Asaad et al. |
| 9,094,224 B2 | 7/2015 | Olofsson et al. |
| 9,143,962 B2 | 9/2015 | Brady |
| 9,148,443 B2 | 9/2015 | Chizeck |
| 9,232,615 B2 | 1/2016 | Cregg et al. |
| 9,300,484 B1 | 3/2016 | Cregg et al. |
| 9,401,763 B2 | 7/2016 | Cregg et al. |
| 9,426,220 B2 | 8/2016 | Chauhan et al. |
| 9,485,677 B2 | 11/2016 | Lightstone et al. |
| 9,755,744 B2 | 9/2017 | Cregg et al. |
| 2003/0103521 A1 | 6/2003 | Raphaeli et al. |
| 2003/0142685 A1 | 7/2003 | Bare |
| 2004/0131125 A1 | 7/2004 | Sanderford et al. |
| 2004/0142685 A1 | 7/2004 | Glasser et al. |
| 2004/0243684 A1 | 12/2004 | Ha et al. |
| 2007/0007898 A1 | 1/2007 | Bruning |
| 2008/0309504 A1 | 12/2008 | Lim |
| 2009/0022151 A1 | 1/2009 | Jeon et al. |
| 2009/0171571 A1 | 7/2009 | Son et al. |
| 2012/0082461 A1 | 4/2012 | Meyer et al. |
| 2013/0293118 A1 | 11/2013 | Nagashima et al. |
| 2014/0022061 A1 | 1/2014 | Apte |
| 2014/0219193 A1 | 8/2014 | Linde |
| 2014/0269425 A1 | 9/2014 | Fisher |
| 2014/0280398 A1 | 9/2014 | Smith et al. |
| 2014/0321268 A1 | 10/2014 | Saltsidis |
| 2015/0019659 A1 | 1/2015 | Eidelson et al. |
| 2015/0120000 A1 | 4/2015 | Coffey et al. |
| 2015/0295949 A1 | 10/2015 | Chizeck et al. |
| 2016/0261538 A1 | 9/2016 | Cregg |

FOREIGN PATENT DOCUMENTS

| | | |
|---|---|---|
| WO | WO 2006/065275 | 6/2006 |
| WO | WO 2010/140136 | 12/2010 |
| WO | WO 2014/007981 | 1/2014 |

OTHER PUBLICATIONS

"Refresh! INSTEON Technology," Electronic Design (EE) Product News, Staff Article, Apr. 5, 2006.

PCT International Search Report and Written Opinion for PCT/US2013/046396 dated Nov. 21, 2013, 2013, 10 pages.

PCT International Written Opinion for PCT/US2013/046396 dated Jun. 26, 2014, 7 pages.

PCT International Preliminary Report on Patentability for PCT/US2013/046396 dated Oct. 8, 2014, in 6 pages.

Malaysian Notice of Allowance, re MY Application No. PI 2012003571, dated Apr. 15, 2016.

U.S. Appl. No. 15/668,168, filed Aug. 3, 2017, Cregg et al.

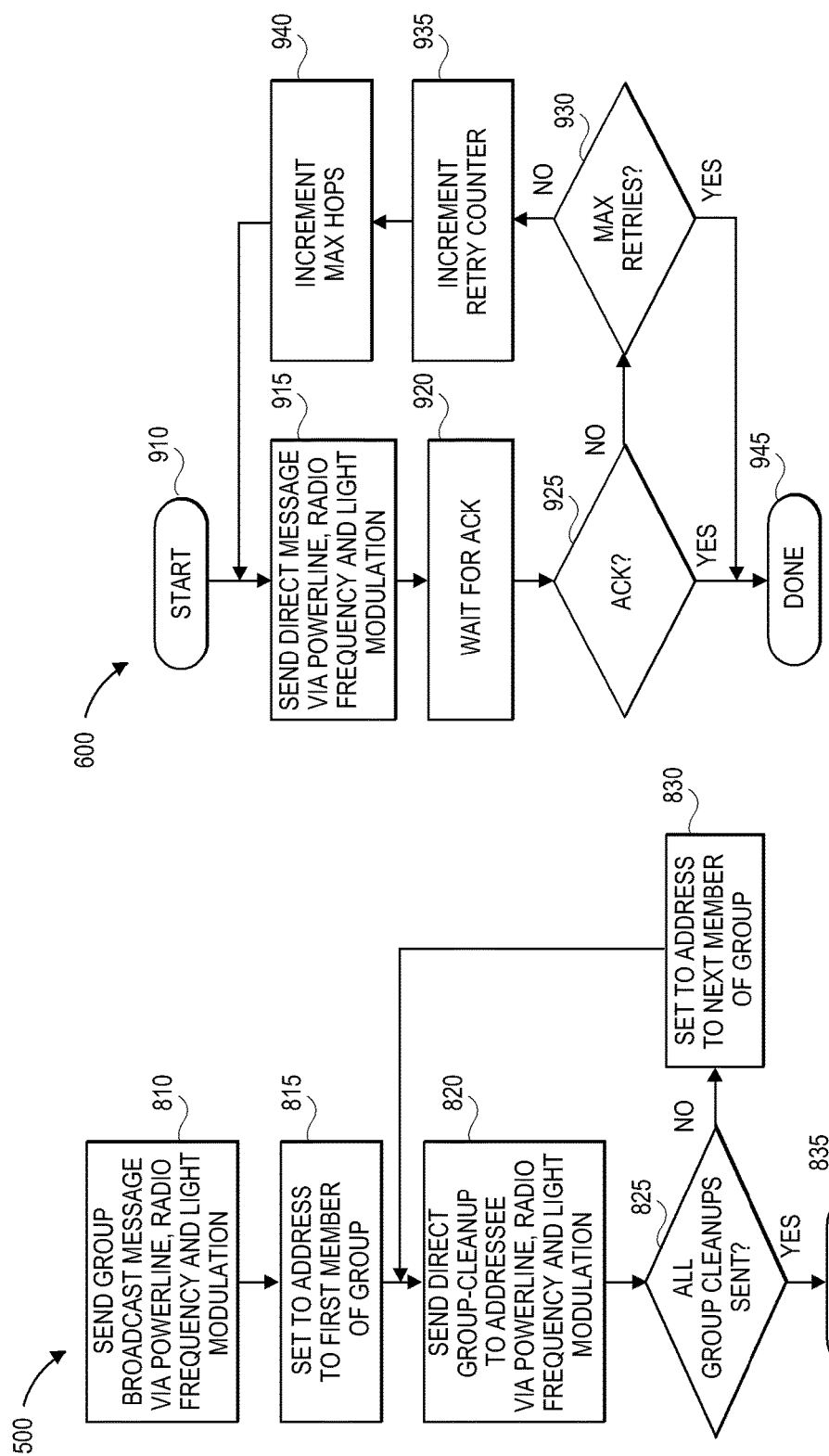

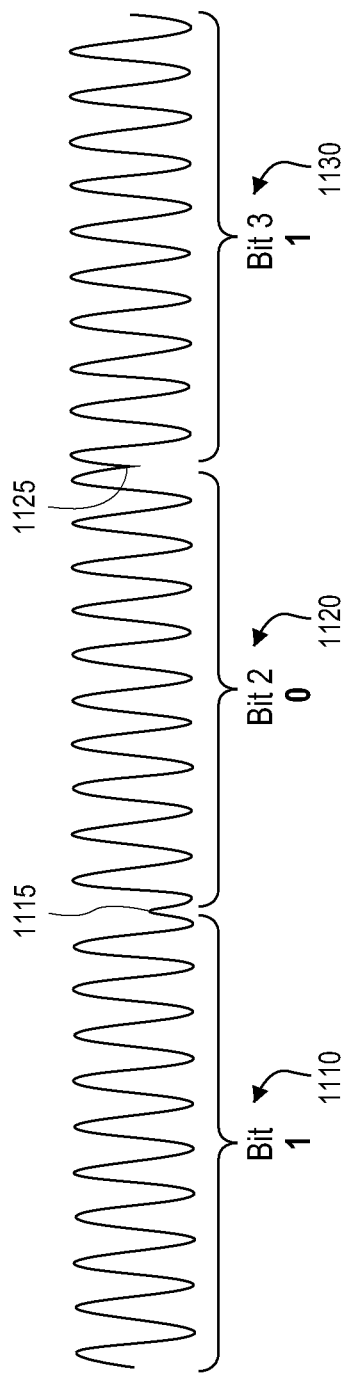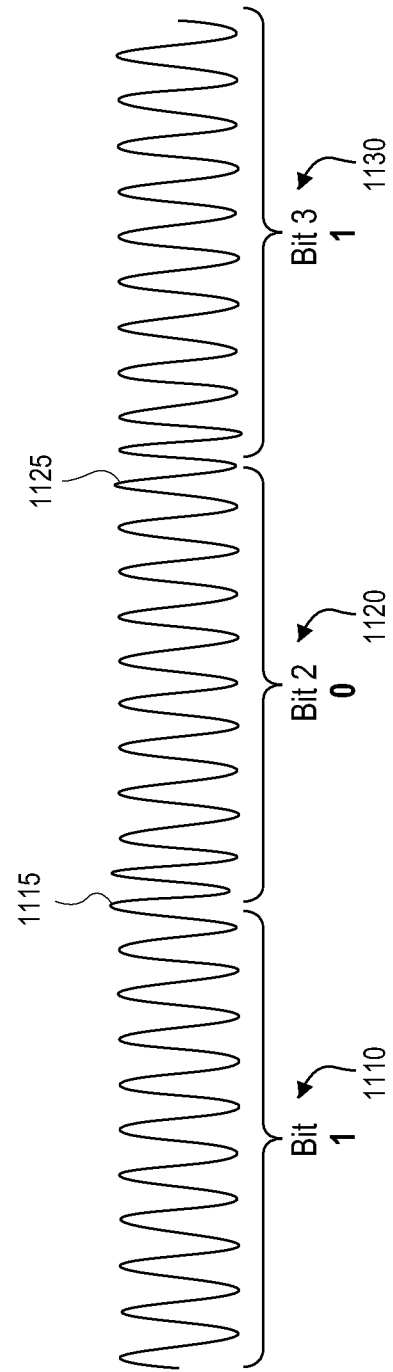
FIG. 10
FIG. 11

1700

| Center Frequency | 915 MHz |
|---|---|
| Data Encoding Method | Mancester |
| Modulation Method | FSK |
| FSK Deviation | 64 KHz |
| FSK Symbol Rate | 76,800 symbols per second |
| Data Rate | 38,400 bits per second |
| Range | 150 feet outdoors |

FIG. 17

MULTI-MEDIA COMMUNICATION DEVICE

INCORPORATION BY REFERENCE TO ANY PRIORITY APPLICATIONS

Any and all applications for which a foreign or domestic priority claim is identified in the Application Data Sheet, or any correction thereto, are hereby incorporated by reference under 37 CFR 1.57.

BACKGROUND

This disclosure relates to the field of electrical lighting sources and more particularly to replaceable light bulb devices using light emitting diodes (LEDs) and further relates to the use of illumination devices to transceive messages without the use of a network controller.

Communication among low-cost devices is useful in many applications. For example, in a home environment, room occupancy sensors, light switches, lamps, lamp dimmers, and a gateway to the Internet can all work together if they are in communication. A room in a home could be illuminated when people are present, or else an alarm could be sounded, depending on conditions established by a program running on a remote computer.

In addition, current LED illumination sources are either non-dimmable or use expensive and inefficient phase angle detection to provide dimming. Dimming levels are determined by the analog phase angle of the chopped sine wave that can vary depending on the alternating current voltage (VAC) powering the lighting circuit, the power line frequency, and the temperature of the individual illumination source. As a result, each illumination source in a bank of illumination sources, although driven from the same phase angle dimmer, may have a different brightness. Further, current illumination sources are inefficient because they store energy during the chopped phases of the main power's alternating current. The large components required to store the energy create undesirable physical dimensions for LED illumination sources.

SUMMARY

LED lighting devices communicate over a communication network using one or more communication mediums to increase the likelihood that messages will be received by the intended recipient. Messages can be sent over the powerline, via radio frequency (RF), and via light modulation of the light emitted from LEDs associated with the LED lighting device.

In addition, communications sent over the network using one or more of powerline messaging, RF messaging, and light modulation messaging can control LED lighting devices. In an embodiment, a dimming feature of the LED lighting device is controlled.

Certain embodiments relate to a method to transmit and receive messages over a network. The method comprises receiving coded messages with electrical circuitry disposed within an enclosure of an illumination device by at least one of radio signals in free space and electrically conducted signals by wire, processing the coded messages with the electrical circuitry disposed within the enclosure of the illumination device, and transmitting the coded messages with the electrical circuitry disposed within the enclosure of the illumination device by at least one of the radio signals in free space and the electrically conducted signals by wire. In an embodiment, the enclosure comprises a bulb and a base, and the electrical circuitry is disposed within the base.

In an embodiment, the method further comprises receiving the coded messages with the electrical circuitry disposed within the enclosure of the illumination device by at least one of the radio signals in free space, the electrically conducted signals by wire, and light wave propagated signals in free space, and transmitting the coded messages with the electrical circuitry disposed within the enclosure of the illumination device by all of the radio signals in free space, the electrically conducted signals by wire, and the light wave propagated signals in free space.

In an embodiment, the method further comprises determining whether radio signal message traffic exceeds a threshold, and when the threshold is exceeded, reducing the radio signal message traffic while continuing to transmit by the electrically conducted signals by wire. In another embodiment, the method further comprises determining whether radio signal message traffic exceeds a threshold, and when the threshold is exceeded, reducing the radio signal message traffic while continuing to transmit by at least one of the electrically conducted signals by wire and the light wave propagated signals in free space. In a further embodiment, the coded messages transmitted by the electrically conducted signals by wire and the coded messages transmitted by the light wave propagated signals in free space use the same carrier signal frequency and the same encoding protocol.

In a yet further embodiment, the method further comprises determining whether the coded message has been transmitted by a first communication medium comprising at least one of the radio signals in free space and the electrically conducted signals by wire, determining if an acknowledgement of the coded message by an intended recipient has been received after transmitting the coded message by the first communication medium, and if the acknowledgement has not been received, transmitting the coded message by a second communication medium comprising at least one of the radio signals in free space and the electrically conducted signals by wire. In another embodiment, the method further comprises determining if the acknowledgement of the coded message by the intended recipient has been received after transmitting the coded message by the second communication medium, and if the acknowledgement has not been received, transmitting the coded message by a third communication medium comprising at least one of the radio signals in free space, the electrically conducted signals by wire, and light wave propagated signals in free space.

In accordance with various embodiment, an illumination device capable of illuminating a space and further capable of reacting to and transmitting messages is disclosed. The illumination device comprises an enclosure, receiving circuitry disposed with the enclosure and configured to receive coded messages by at least one of radio signals in free space and electrically conducted signals by wire, processing circuitry disposed within the enclosure and configured to process the coded messages, and transmitting circuitry disposed within the enclosure and configured to transmit the coded messages by at least one of the radio signals in free space and the electrically conducted signals by wire. In an embodiment, the enclosure comprises a bulb and a base, and the receiving circuitry, the processing circuitry, and the transmitting circuitry are disposed within the base.

In an embodiment, the receiving circuitry is further configured to receive the coded messages by at least one of the radio signals in free space, the electrically conducted signals by wire, and light wave propagated signals in free space and the transmitting circuitry is further configured to transmit the coded messages by all of the radio signals in free space, the electrically conducted signals by wire, and the light wave propagated signals in free space. In another embodiment, the coded messages transmitted by the electrically conducted signals and the coded messages transmitted by the light wave propagated signals in free space use the same carrier signal frequency and the same encoding protocol.

In an embodiment, the processing circuitry is further configured to determine whether radio signal message traffic exceeds a threshold, and when the threshold is exceeded, reduce the radio signal message traffic while continuing to transmit by the electrically conducted signals by wire.

In another embodiment, the illumination device further comprises power line circuitry disposed within the enclosure and configured to electrically conduct the coded messages over a power line wire, and radio frequency (RF) circuitry disposed within the enclosure and configured to receive and transmit the coded messages using the radio signals in free space. In yet another embodiment the illumination device further comprises light wave modulation/demodulation circuitry disposed within the enclosure and configured to receive and transmit the coded messages using light wave propagated signals in free space. In a further embodiment, the enclosure comprises a bulb and a base, the powerline circuitry, the radio frequency circuitry, and the light wave modulation/demodulation circuitry are disposed within the base.

In an embodiment, the processing circuitry is further configured to determine whether the coded message has been transmitted by a first communication medium comprising at least one of the radio signals in free space and the electrically conducted signals by wire, determine if an acknowledgement of the coded message by an intended recipient has been received after transmitting the coded message by the first communication medium, and if the acknowledgement has not been received, transmit the coded message by a second communication medium comprising at least one of the radio signals in free space and the electrically conducted signals by wire. In an embodiment, the processing circuitry is further configured to determine whether message traffic for the electrically conducted signals by wire exceeds a threshold, and when the threshold is exceeded, transmit the coded message by the electrically conducted signals by wire.

Certain embodiments relate to a method to transmit and receive messages over a network. The method comprises receiving coded messages by at least one of radio signals in free space, electrically conducted signals by wire, and light wave propagated signals in free space, processing the coded messages, and transmitting the coded messages by all of the radio signals in free space, the electrically conducted signals by wire, and the light wave propagated signals in free space.

In an embodiment, the method further comprises determining whether radio signal message traffic exceeds a threshold, and when the threshold is exceeded, reducing the radio signal message traffic while continuing to transmit by the electrically conducted signals by wire and the light wave propagated signals in free space. In another embodiment, the method further comprises determining whether radio signal message traffic exceeds a threshold, and when the threshold is exceeded, preventing devices from transmitting the coded messages by the radio signals in free space while continuing to transmit by the electrically conducted signals by wire and the light wave propagated signals in free space.

In a further embodiment, the coded messages transmitted by the electrically conducted signals and the coded messages transmitted by the light wave propagated signals in free space use the same carrier signal frequency and the same encoding protocol. In an embodiment, the carrier signal frequency is between approximately 100 KHz to approximately 200 KHz and the encoding protocol comprises binary phase shift keying (BPSK).

In another embodiment, the method further comprises determining whether the coded message has been transmitted by a first communication medium comprising at least one of the radio signals in free space, the electrically conducted signals by wire, and the light wave propagated signals in free space, determining if an acknowledgement of the coded message by an intended recipient has been received after transmitting the coded message by the first communication medium, and if the acknowledgement has not been received, transmitting the coded message by a second communication medium comprising at least one of the radio signals in free space, the electrically conducted signals by wire, and the light wave propagated signals in free space. The method further comprises determining if the acknowledgement of the coded message by the intended recipient has been received after transmitting the coded message by the second communication medium, and if the acknowledgement has not been received, transmitting the coded message by a third communication medium comprising at least one of the radio signals in free space, the electrically conducted signals by wire, and the light wave propagated signals in free space.

In accordance with various embodiments, an electrical circuit capable of illuminating a space and further capable of reacting to and transmitting messages is disclosed. The electrical circuit comprises receiving circuitry configured to receive coded messages by at least one of radio signals in free space, electrically conducted signals by wire, and light wave propagated signals in free space, processing circuitry configured to process the coded messages, and transmitting circuitry configured to transmit the coded messages by all of the radio signals in free space, the electrically conducted signals by wire, and the light wave propagated signals in free space. The electrical circuit further comprises power line circuitry configured to electrically conduct the coded messages over a power line wire, radio frequency (RF) circuitry configured to receive and transmit the coded messages using the radio signals in free space, and light wave modulation/demodulation circuitry configured to receive and transmit the coded messages using the light wave propagated signals in free space, where the light wave modulation/demodulation circuitry comprises an optical sensor, an array of one or more light emitting diodes (LEDs), and an LED driver.

In an embodiment, the processing circuitry is further configured to determine whether message traffic for the electrically conducted signals by wire exceeds a threshold, and when the threshold is exceeded, only transmit the coded message by the light wave propagated signals in free space.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 5 illustrates a process to transmit messages to groups of devices within the communication network, according to certain embodiments.

FIG. 6 illustrates a process to transmit direct messages with retries to devices within the communication network, according to certain embodiments.

FIG. 10 illustrates a powerline BPSK signal, according to certain embodiments.

FIG. 11 illustrates a powerline BPSK signal with transition smoothing, according to certain embodiments.

FIG. 17 is a table of exemplary specifications for RF signaling within the communication network, according to certain embodiments.

DETAILED DESCRIPTION OF THE PREFERRED EMBODIMENT

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the inventions and not to limit the scope of the disclosure.

Figure 1:
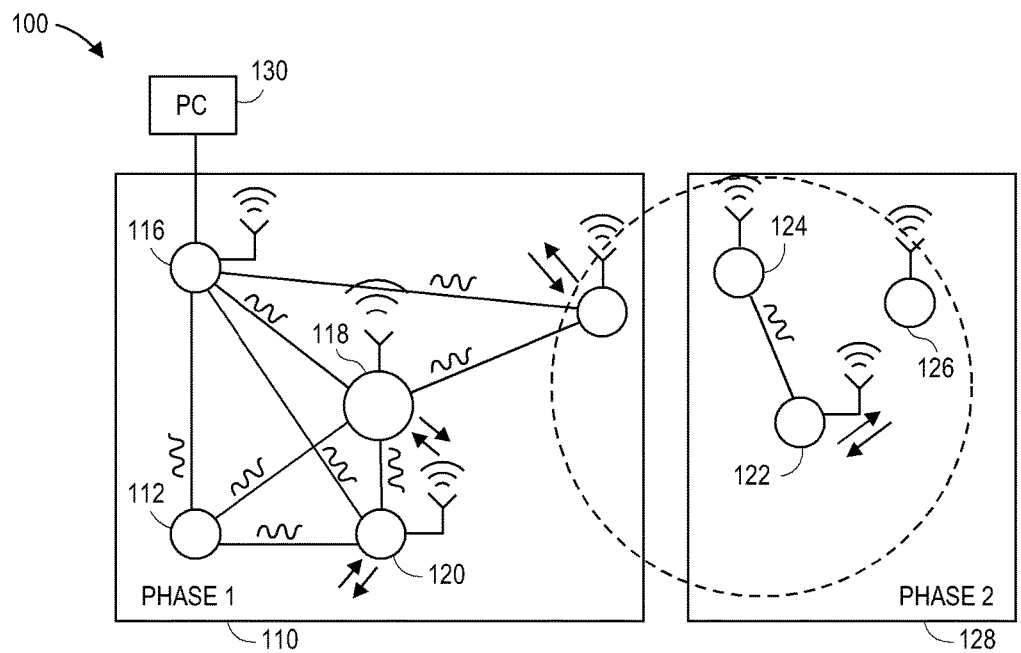
FIG. 1 is a block diagram of a communication network with devices using powerline, RF signaling, and light modulation signaling, according to certain embodiments.

FIG. 1 is a block diagram of a communication network 100 of control and communication devices 112-126 communicating over the network 100 using one or more of powerline signaling, RF signaling, and light modulation signaling. In an embodiment, the communication network 100 comprises a mesh network. In another embodiment, the communication network 100 comprises a simulcast mesh network. In a further embodiment, the communication network comprises a mesh network including a powerline network, and light modulation network.

Electrical power is most commonly distributed to buildings and homes in North America as two-phase 220-volt alternating current (220 VAC). At the main junction box to the building, the three-wire 220 VAC power line is split into two two-wire 110 VAC power lines, known as Phase 1 and Phase 2. Phase 1 wiring is typically used for half the circuits in the building, and Phase 2 is used for the other half. In the exemplary network 100, devices 112, 114, 116, 118, 120 are connected to a Phase 1 power line 110 and devices 122, 124, 126, are connected to a Phase 2 power line 128.

In network 100, device 112 is configured to communicate over the power line; device 126 is configured to communicate via RF; and devices 116 and 124 are configured to communicate over the powerline and via RF. Additionally device 116 can be configured to communicate to a computer 130 and other digital equipment using, for example, RS232, USB, and Ethernet protocols and communication hardware. Device 116 on the network 100 communicating with computer 130 and other digital devices can, for example, bridge to networks of otherwise incompatible devices in a building, connect to computers, act as nodes on a local-area network (LAN), or get onto the global Internet.

Devices 114, 118, 120, 122 comprise light emitting diode (LED) lighting devices and are configured to communicate over the power line, via RF, and using modulated light techniques.

In an embodiment, devices, such as devices 112, 114, 116, 118, 120, 122, 124 that send and receive messages over the power line, use the Insteon® Powerline protocol, and devices, such as devices 114, 116, 118, 120, 122, 124, 126 that send and receive radio frequency (RF) messages, use the Insteon® RF protocol, as defined in U.S. Pat. Nos. 7,345,998 and 8,081649 which are hereby incorporated by reference herein in their entireties. INSTEON® is a trademark of the applicant.

LED lighting devices 114, 118, 120, 122 send messages using modulation of the light emitted from the devices' LED and received modulated light encoded messages.

Figure 21:
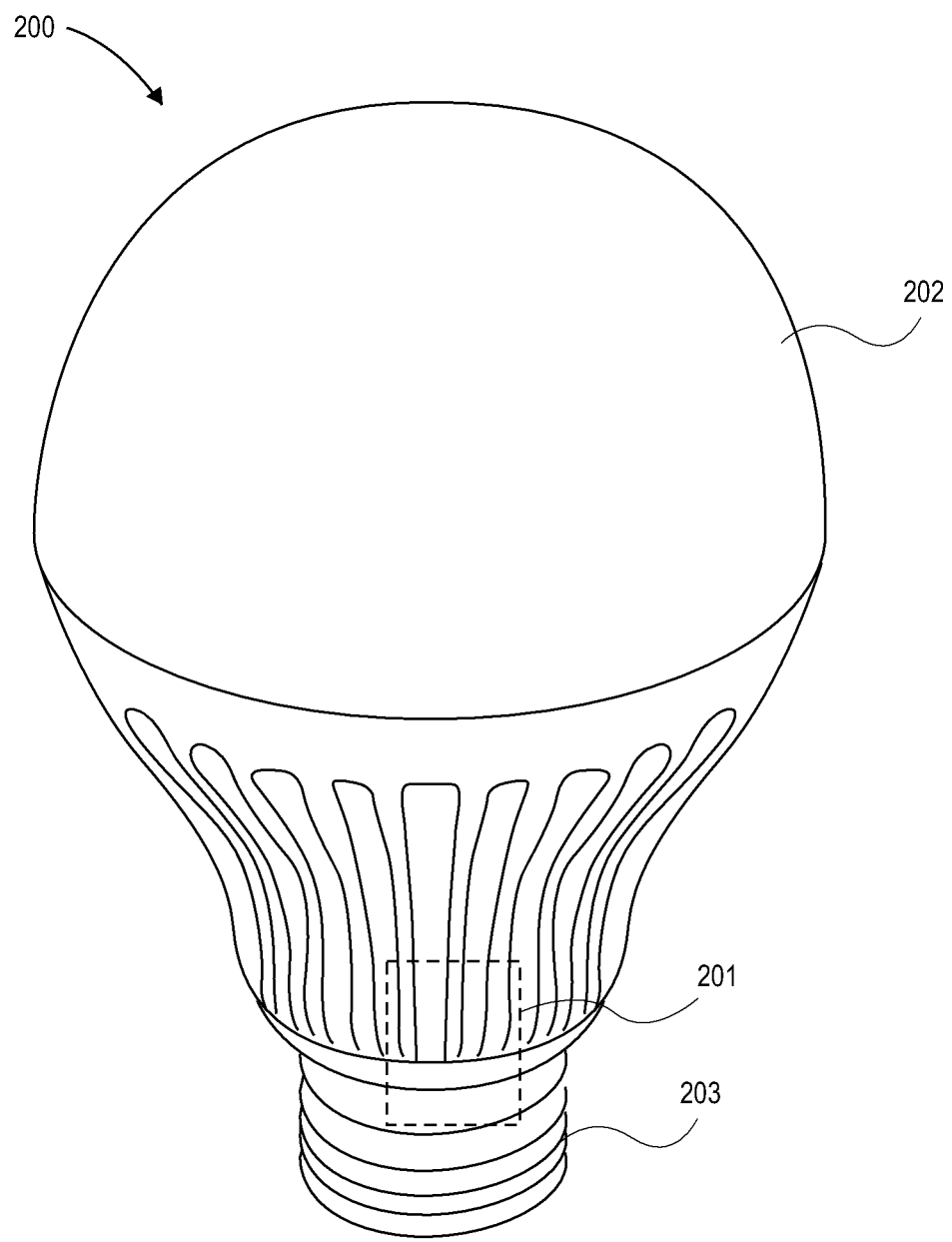
FIG. 21 illustrates an illumination device capable of transmitting and receiving messages over the communication network via powerline signaling, RF, and modulation of light, according to certain embodiments.

FIG. 21 illustrates an illumination device 200, such as an LED illumination device or module, and incandescent illumination device, a fluorescent illumination device, and the like. The illumination device 200 comprises an enclosure including a bulb 202 and a base 203. In an embodiment, the bulb 202 comprises glass, plastic, or other transparent or translucent material capable of emitting light waves from an illumination source, such as an LED array, a filament, or the like, within the enclosure. The base 203 attaches to the bulb and to a power source used to power the illumination source. For example, the bulb 203 can comprise threads for screwing the bulb into a standard light bulb socket electrically connected to 110-120 VAC house wiring.

The illumination device 200 further comprises electrical circuitry 201 disposed with the enclosure, as indicated by the dashed box. In an embodiment, the electrical circuitry 201 is configured to receive coded messages, process coded messages, and transmit coded messages. In another embodiment, the electrical circuitry 201 comprises at least one of receiving circuitry, processing circuitry, and transmitting circuitry. In a further embodiment, the electrical circuitry 201 comprises at least one of power line circuitry, radio frequency circuitry, and light wave modulation/demodulation circuitry.

Figure 2:
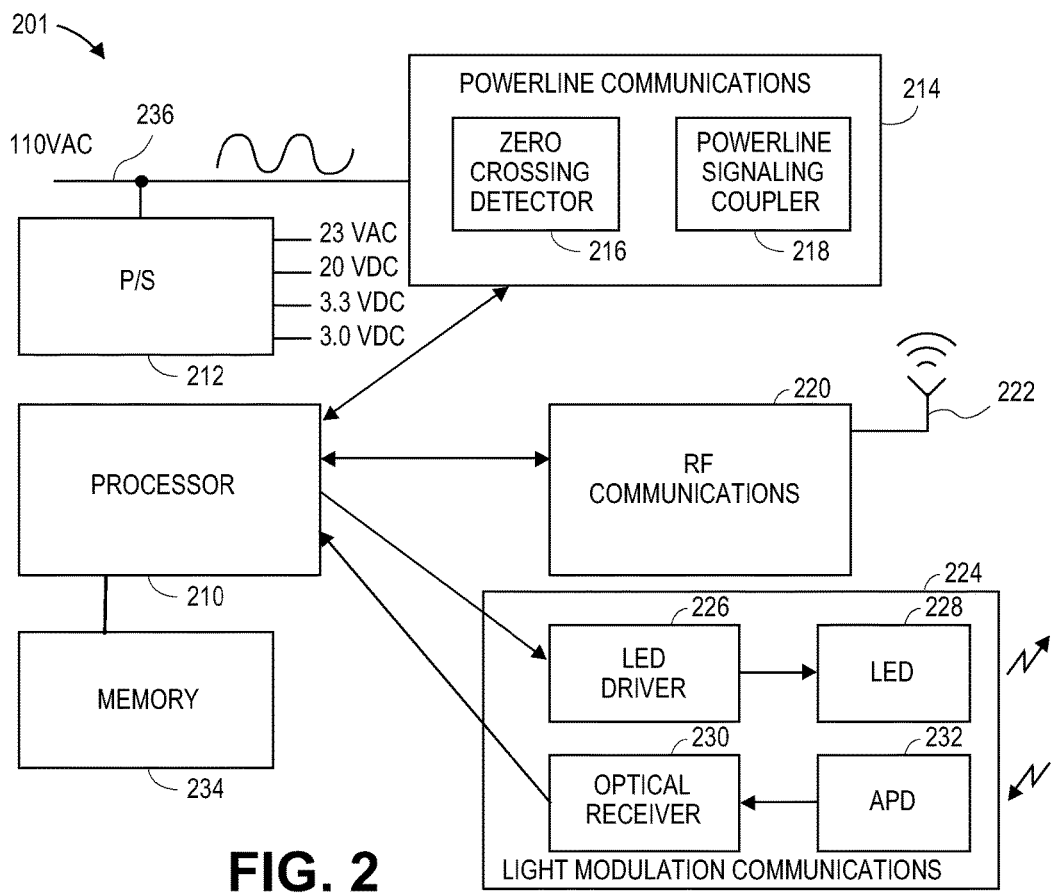
FIG. 2 is a block diagram of an LED illumination module with powerline, RF, and light modulation signaling capabilities, according to certain embodiments.

FIG. 2 is a block diagram of the electrical circuitry 201 disposed within the enclosure of the illumination device 200 comprising powerline (PL), RF, and light modulation signaling capabilities. The electrical circuitry 201 comprises a processor 210, a power supply 212, powerline communication circuitry 214, RF communication circuitry 220, and light modulation circuitry 224.

Power Supply

The power supply 212 receives a 110 VAC power signal over the power line 236 and generates one or more voltages, such as 20 VDC, 3.3 VDC, 3.0 VDC, for example, to power the circuitry 210, 214, 220, 224. In other embodiments, the power supply 212 converts the line voltage to other direct current voltage and transforms the line voltage to other alternating current voltages as need by the accompanying circuitry 210, 214, 220, 224. In an embodiment, the power supply components comprise a high efficiency mains or power line voltage to communications drive and logic level voltages via a buck regulator two-stage supply. In an embodiment, the power supply 212 uses full wave rectification to take advantage of the energy of both the positive and negative portions of the AC supply.

Processor

The processor circuitry 210 provides program logic and memory 234 in support of programs and intelligence within the LED lighting device 200, as well as bulb functions, such as dimming, ON, and OFF. The program logic may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

In an embodiment, the processor circuitry 220 comprises a computer and associated memory. The computers comprise, by way of example, processors, program logic, or other substrate configurations representing data and instructions, which operate as described herein. In other embodiments, the processors can comprise controller circuitry, processor circuitry, processors, general purpose single-chip or multi-chip microprocessors, digital signal processors, embedded microprocessors, microcontrollers and the like. The memory 234 can comprise one or more logical and/or physical data storage systems for storing data and applications used by the processor 220 and the program logic.

In an embodiment, programming may include day-light harvesting, local device timers, macros, and automatic LED brightness control to prevent damage to the LEDs if ambient temperature conditions put them at risk. In an embodiment, the LED lighting module 200 comprises internal temperature sensing that can be used as a network-based remote temperature sensor when device-generated heat is taken into account.

In other embodiments, the programming may include processes to determine whether to simultaneous transmit or retransmit messages over the powerline, via RF and using light modulation, or to determine a preferred one of the powerline, RF and light modulation physical layers for message transmission/retransmission. In a further embodiment, the programming may a process to determine from which physical layer the majority of message traffic is on, and to determine which physical layer (PL, RF, light modulation) to transmit/retransmit messages to increase message reception by the intended recipient device.

Powerline (PL) Communications

The LED lighting module 200 uses binary phase-shift keying (BPSK) networking to communicate to other devices over the power line. In another embodiment, the LED lighting module 200 uses binary phase-shift keying (BPSK) simulcast mesh networking to communicate to other devices over the power line.

In other embodiments, other encoding schemes, such as return to zero (RZ), Nonreturn to Zero-Level (NRZ-L), Nonreturn to Zero Inverted (NRZI), Bipolar Alternate Mark Inversion (AMI), Pseudoternary, differential Manchester, Amplitude Shift Keying (ASK), Phase Shift Keying (PSK), and the like, could be used.

The powerline communication circuitry comprises a zero crossing detector 216 and a powerline signaling coupler 218. The zero crossing detector 216 determines when the alternating current line voltage waveform is at a zero crossing. The powerline signaling coupler 218 encodes a message using BPSK onto a carrier signal or decodes a BPSK message from the carrier signal based at least in part on the timing provided by the zero crossing detector 216.

To transmit a powerline message, the processor 210 sends the message data to the powerline coupling circuitry 218 which encodes the data using BPSK onto a carrier signal which is sent over a portion of the power line signal at the appropriate time as determined by the zero crossing detector 216. To receive a powerline message, the powerline coupling circuitry 218 receives the BPSK data encoded powerline signal from the power line 236. The powerline signaling coupler 218 decodes the BPSK data from the carrier signal based at least in part on the timing provided by the zero crossing detector 216. The powerline signaling coupler 218 sends the data to the processor 210 for processing.

In an embodiment the carrier signal frequency is preferable approximately 131.65 KHz. In another embodiment, the carrier signal frequency is between approximately 120 KHz and approximately 140 KHz. In a further embodiment, the carrier signal frequency is approximately 110 KHz to approximately 150 KHz. In a yet further embodiment, the carrier signal frequency is approximately 100 KHZ to approximately 120 KHz. In other embodiments the carrier signal frequency is less than 100 KHz. In further embodiments, the carrier signal frequency is greater than 200 KHz.

The power line communications work well in environments where RF and light modulation communications fail. In an embodiment, the power line signaling coupler 218 provides an inexpensive tie to the line voltage, while the zero-crossing detection circuit 216 provides an over-all network synchronization to the AC mains.

Radio Frequency (RF) Communications

The RF communications circuit 220 uses narrow band frequency shift keying (FSK) communications. The processor 210 sends message data to the RF communications circuitry 220, where the data is encoded using FSK onto a baseband signal, which is up converted and transmitted from antenna 222 to other devices on the network 100. In addition, the antenna 222 receives RF signals which are down converted to a baseband FSK encoded signal and decoded by the RF communications circuitry 220. The processor circuitry 210 receives the decoded message data and processes the message.

Light Modulation Communications

The light modulation communication circuitry 224 comprises a visible light transceiver and includes LED driver circuitry 226 and one or more LEDs 228 configured to transmit messages optically. The modulation circuitry 224 further includes an optical sensor 232 and optical receiver circuitry 230 configured to receive messages optically. The drive circuit 226 and the LEDs 228 have very fast ON/OFF switching times allowing for pulse-width modulation (PWM) control or other modulation techniques. In an embodiment, continuous mains power enables the pulse width modulation output to the LEDs 228 as a constant current source.

Dimmable control of the LED illumination device 200 may be accomplished using medium and high frequency pulse width modulation. Modulation control is adjusted by the processor circuitry 220 to send messages without interrupting the illumination mission. Because dimming is actuated via commands, a message may contain a specific digital level and ramp or fade rate that is highly consistent from LED illumination device to the next.

To transmit a light modulated message, the processor 220 sends message data to the LED driver circuitry 226 to drive the LEDs 228 to produce modulated light encoding the message. To receive light modulated messages, the modulated light is received by the optical sensor 232, such as an avalanche photodiode. The resulting electrical signal is received by the optical receiver 230 which decodes the message from the electrical signal and sends the message to the processor 220 for processing.

In an embodiment, the light modulation circuitry 224 uses the same encoding protocol, such as BPSK, for example, and the same carrier signal as the powerline signaling described above. In an embodiment, the timing and the signaling for the light modulation communications may be the same as that used for the powerline communications. Advantageously, the BPSK signaling and bit transitions at the carrier signal frequency described above with respect to the powerline communications do not cause visually detectable flicker in the LED light output. Further, such encoded messages support pulse width modulation (PWM) dimming as well as embedding phase shift data.

In an embodiment, messages may be sent between LED lighting devices 200 when bulb operation includes modulation pauses in output for message reception. In another embodiment, messages may be sent between LED lighting devices 200 simultaneously by using alternate light sensors 232.

In another embodiment, the messages are encoded using binary phase shift keying (BPSK) on an approximately 131.65 KHz carrier signal modulated onto the light from the LEDs. In an embodiment, the light modulation circuitry 224 uses the same encoding protocol, such as BPSK, for example, and the same carrier signal as the powerline signaling described above. In an embodiment, the timing and the signaling for the light modulation communications may be the same as that used for the powerline communications. Advantageously, the BPSK signaling and bit transitions at the carrier signal frequency described above with respect to the powerline communications do not cause visually detectable flicker in the LED light output. Further, such encoded messages support pulse width modulation (PWM) dimming as well as embedding phase shift data.

In an embodiment, the LED lighting device 200 replaces conventional illumination sources such as a common screw-in type light bulb. LED lighting devices 200 can provide lighting solutions over a range of different form factors and particularly with those that include metal housings surrounding most of a bulb which results in shielding RF communications. This is particularly common in recessed ceiling light fixtures. Form factors such as A19, standard screw-in type incandescent light bulb, a fluorescent tube, or other common replaceable illumination elements can be used. Examples of other form factors are the A series, the B series, the C-7/F series, the G series, the P-25/ps-35 series, the BR series, the R series, the RP-11/S series, the Par series, the T series, and the like.

A user can turn on specific LED lighting devices 200 helpful for some activities in a room or area while not intruding on other activities. For instance, one portion of a room may have lights that are dimmed while another portion of the room may have lights that are at a higher level of output. Individual light bulb control is beneficial for accent lighting such as for art objects, or for up-lighting artistic effects.

In an embodiment, the LED illumination module 200 comprises a simulcast mesh dimmable Insteon® illumination source which is referred to using the term "Insteon bulb" which uses Insteon® technology as defined in U.S. Pat. Nos. 7,345,998 and 8,081,649 which are hereby incorporated by reference herein in their entireties. The Insteon bulb propagates messages using wireless radio frequency broadcasting, power wiring conduction, and relatively high frequency pulse width modulated visible light. The precise control in brightness that is possible with an LED enables a light output (illumination) to be used as a communication source that is hidden within the visible illuminating light output itself. The Insteon bulb uses power lines and radio frequency transmission to send and receive messages efficiently to all other Insteon bulbs simultaneously.

The communication network 100 may function using radio communications only, power line communications only, light modulation communications only, any two simultaneously, all three simultaneously, in a sequence of two or more, or in an intelligently determined hierarchy. This creates a significant advantage, in that, alone, one transmission medium may fail to meet a particular objective while simulcasting over two or more media may succeed.

Referring to FIG. 1, devices 114-124 that use two or more of the powerline, RF, and modulation communication media or layers solve a significant problem experienced by devices that only communicate via the powerline, such as device 112. Powerline signals on opposite powerline phases 10 and 11 are severely attenuated because there is no direct circuit connection for them to travel over. Using devices capable of communicating over two or more of the communication layers solves the powerline phase coupling problem whenever such devices are connected on opposite powerline phases.

As shown in FIG. 1, LED lighting device 114 is installed on powerline phase 1 110 and device 124 is installed on powerline phase 2 128. LED lighting device 114 can communicate via power line with devices 116, 118 on powerline phase 1 110, but it can also communicate via power line with device 124 on powerline phase 2 128 because it can communicate using RF signaling or light modulation with device 122, which in turn is directly connected to powerline phase 2 128. The dashed circle represents the RF range of device 122. Direct RF paths between devices 114 to 124 (1 hop), or indirect paths using 122 and 124 (2 hops) allow messages to propagate between the powerline phases.

Each device 112-126 is configured to repeat messages to others of the devices 112-126 on the network 100. In an embodiment, each device 112-126 is capable of repeating messages, using the protocols as described herein. Further, the devices 112-126 are peers, meaning that any device can act as a master (sending messages), slave (receiving messages), or repeater (relaying messages). Adding more devices configured to communicate over more than one physical layer increases the number of available pathways for messages to travel. Path diversity results in a higher probability that a message will arrive at its intended destination.

For example, RF device 120 desires to send a message to device 114, but device 114 is out of range. The message will still get through, however, because devices within range of device 120, such as devices 112, 116, 118 will receive the message and repeat it to other devices within their respective ranges. There are many ways for a message to travel: device 120 to 118 to 114 (2 hops), device 120 to 112 to 118 to 114 (3 hops), device 120 to 116 to 112 to 1118 to 114 (4 hops) are some examples.

Unless there is a limit on the number of hops that a message may take to reach its final destination, messages might propagate forever within the network 100 in a nested series of recurring loops. Network saturation by repeating messages is known as a "data storm." The message protocol avoids this problem by limiting the maximum number of hops an individual message may take to some small number, such as, for example, four. In other embodiments, the number of hops is limited to less than 4. In other embodiments, the number of hops is limited to a number greater than 4 and less than 10.

Figure 3:
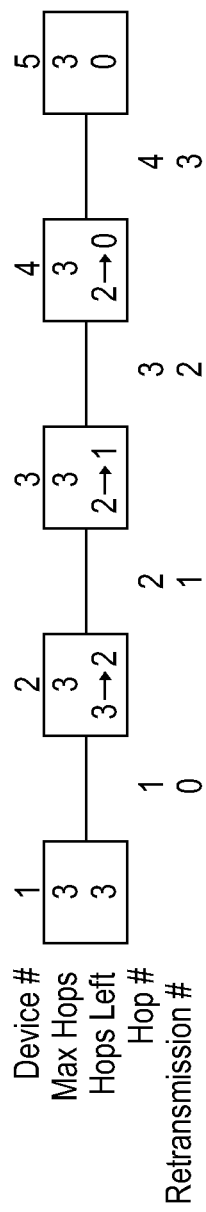
FIG. 3 is a block diagram illustrating message retransmission within the communication network, according to certain embodiments.

FIG. 3 is a block diagram illustrating message retransmission within the communication network 100. In order to improve network reliability, the LED lighting devices 200 retransmit messages intended for other devices on the network 100. This increases the range that the message can travel to reach its intended device recipient.

However, to avoid endless repetition data storms, in an embodiment, messages can be retransmitted a maximum of three times. In other embodiments, the number of times a message can be retransmitted is less than 3. In further embodiments, the number of times a message can be retransmitted is greater than 3. The larger the number of retransmissions, however, the longer the message will take to complete.

Embodiments comprise a pattern of transmissions, retransmissions, and acknowledgements that occurs when messages are sent. Message fields, such as Max Hops and Hops Left manage message retransmission. In an embodiment, messages originate with the 2-bit Max Hops field set to a value of 0, 1, 2, or 3, and the 2-bit Hops Left field set to the same value. A Max Hops value of zero tells other devices within range not to retransmit the message. A higher Max Hops value tells devices receiving the message to retransmit it depending on the Hops Left field. If the Hops Left value is one or more, the receiving device decrements the Hops Left value by one, then retransmits the message with the new Hops Left value. Devices 200 that receive a message with a Hops Left value of zero will not retransmit that message. Also, a device 200 that is the intended recipient of a message will not retransmit the message, regardless of the Hops Left value.

In other words, Max Hops is the maximum retransmissions allowed. All messages "hop" at least once, so the value in the Max Hops field is one less than the number of times a message actually hops from one device to another. In embodiments where the maximum value in this field is three, there can be four actual hops, comprising the original transmission and three retransmissions. Four hops can span a chain of five devices. This situation is shown schematically in FIG. 3.

Figure 4A:
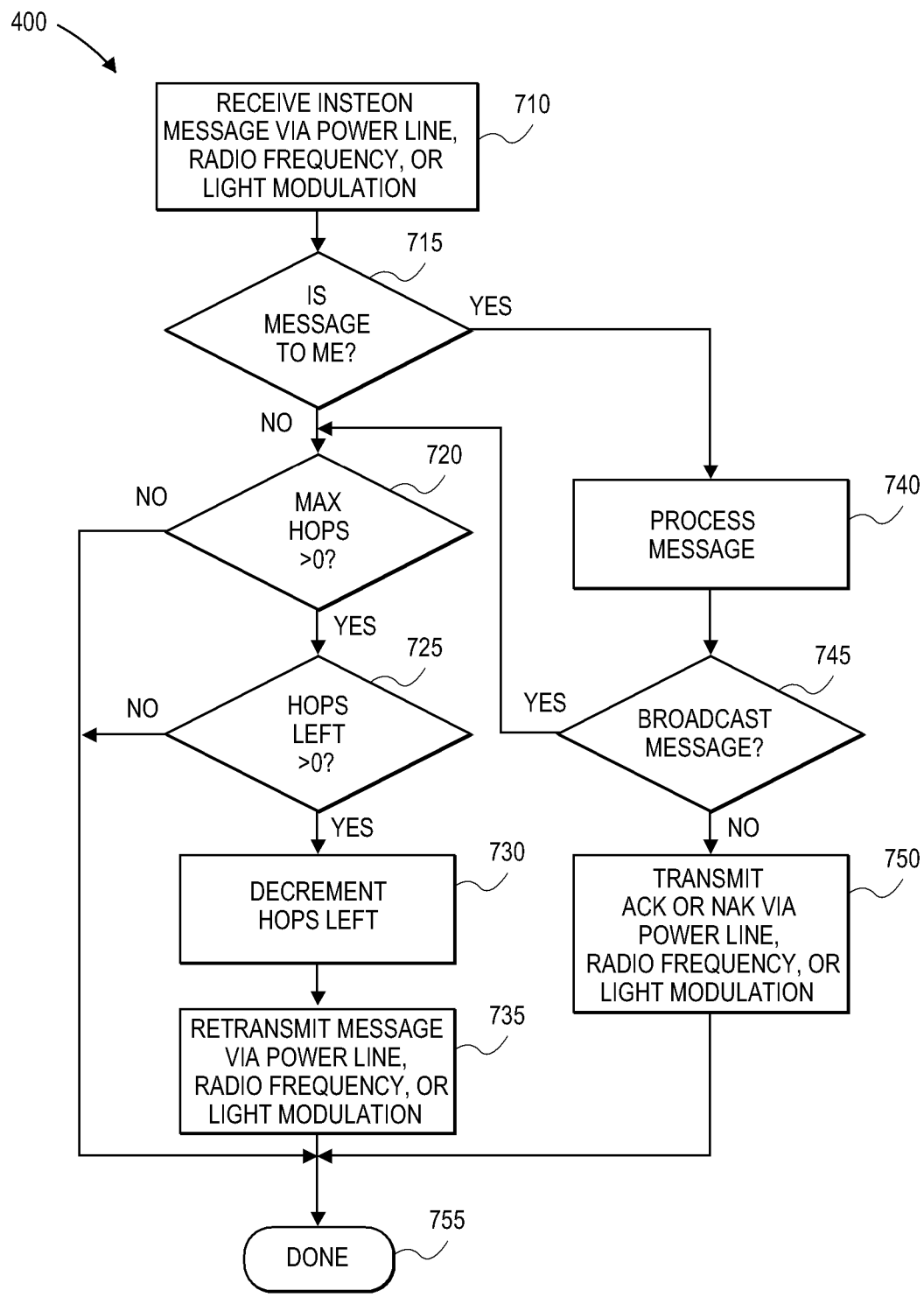
FIG. 4A illustrates a process to receive messages within the communication network, according to certain embodiments.

FIG. 4A illustrates a process 400 to receive messages within the communication network 100. The flowchart in FIG. 4A shows how the LED device 200 receives messages and determines whether to retransmit them or process them. At step 710, the device 200 receives a message via powerline, RF or light modulation.

At step 715, the process 400 determines whether the device 200 needs to process the received message. The device 200 processes Direct messages when the device 200 is the addressee, Group Broadcast messages when the device 200 is a member of the group, and all Broadcast messages.

If the received message is a Direct message intended for the device 200, a Group Broadcast message where the device 200 is a group member, or a Broadcast message, the process 400 moves to step 740. At step 740, the device 200 processes the received message.

At step 745, the process 400 determines whether the received message is a Group Broadcast message or one of a Direct message and Direct group-cleanup message. If the message is a Direct or Direct Group-cleanup message, the process moves to step 750. At step 750, the device 200 sends an acknowledge (ACK) or a negative acknowledge (NAK) message back to the message originator in step 750 and ends the task at step 755.

In an embodiment, the process 400 simultaneously sends the ACK/NAK message over the powerline, via RF, and via light modulation. In another embodiment, the process 400 sends the ACK/NAK message over the powerline, via RF, and via light modulation. In another embodiment, the process 400 intelligently selects which physical layer (power line, RF, light modulation) to use for ACK/NAK message transmission. In a further embodiment, the process 400 sequentially sends the ACK/NAK message using a different physical layer for each subsequent retransmission.

If at step 745, the process 400 determines that the message is a Broadcast or Group Broadcast message, the process 400 moves to step 720. If, at step 715, the process 400 determines that the device 200 does not need to process the received message, the process 400 also moves to step 720. At step 720 the process 400 determines whether the message should be retransmitted.

At step 720, the Max Hops bit field of the Message Flags byte is tested. If the Max Hops value is zero, process 400 moves to step 755, where it is done. If the Max Hops filed is not zero, the process moves to step 725, where the Hops Left filed is tested.

If there are zero Hops Left, the process 400 moves to step 755, where it is finished. If the Hops Left field in not zero, the process 400 moves to step 730, where the process decrements the Hops Left value by one.

At step 735, the process 400 retransmits the message. In an embodiment, the process 400 simultaneously retransmits the message over the power line, via RF, and via light modulation. In another embodiment, the process 400 retransmits the message over the power line, via RF, and via light modulation. In another embodiment, the process 400 intelligently selects which physical layer (PL, RF, light modulation) to use for message retransmission. In a further embodiment, the process 400 sequentially retransmits the message using a different physical layer for each subsequent retransmission.

Figure 4B:
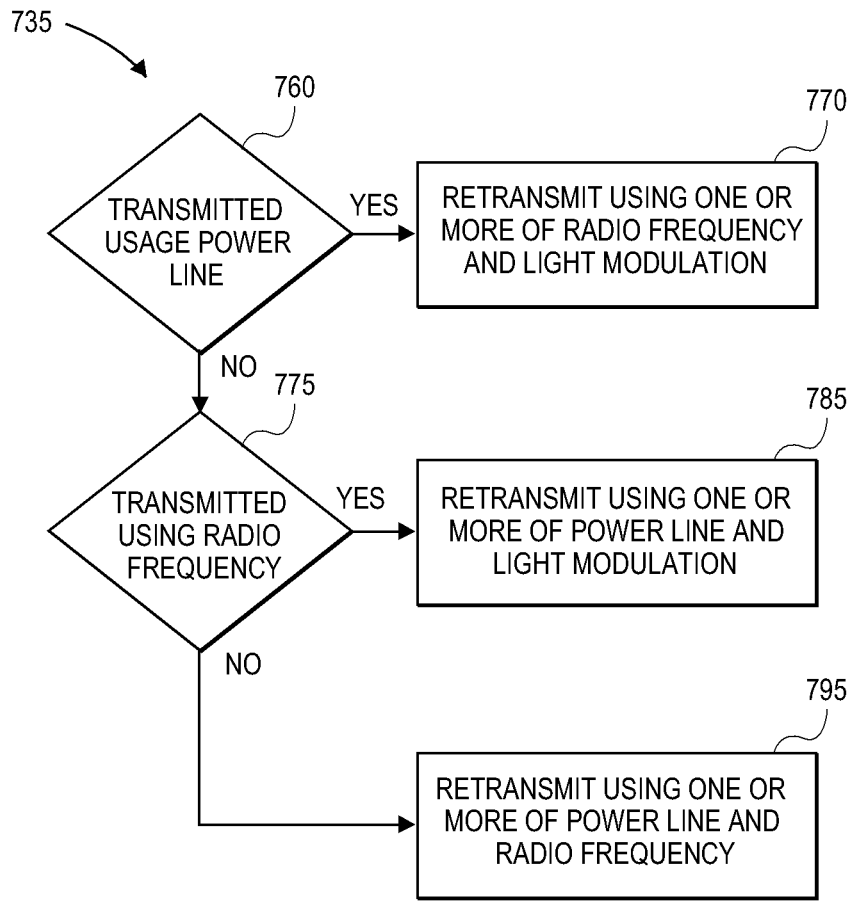
FIG. 4B illustrates a process to retransmit messages within the communication network, according to certain embodiments.

FIG. 4B illustrates an embodiment of the process at step 735 to retransmit messages within the communication network 100 using transmission media in any order.

At step 760, the process 735 determines if the message was transmitted using powerline communications. If the message had previously been transmitted over the power line, at step 770, the process 400 retransmits the message using one or more of radio frequency signaling and light modulation signaling.

If the message had not been previously transmitted over the power line, the process 735 checks whether the message had previously been transmitted using radio frequency and/or light modulation signaling. At step 775, the process 735 determines if the message was transmitted using radio frequency communications. At step 785, if the message had previously been transmitted using radio frequency communications, the process 735 retransmits the message using one or more of powerline signaling and light modulation signaling.

At step 795, if the message had previously been transmitted using neither powerline signaling nor radio frequency signaling, the process 735 retransmits the message using one or more of radio frequency signaling and light modulation signaling.

Thus, the process 735 sequences through hierarchies of the communication media. In an embodiment, this could be implemented using a message bit representing a Media Counter to sequence through the physical layers used to send a transmission. Different logic could be used to determine which combinations of media are used to retransmit the message.

Figure 4C:
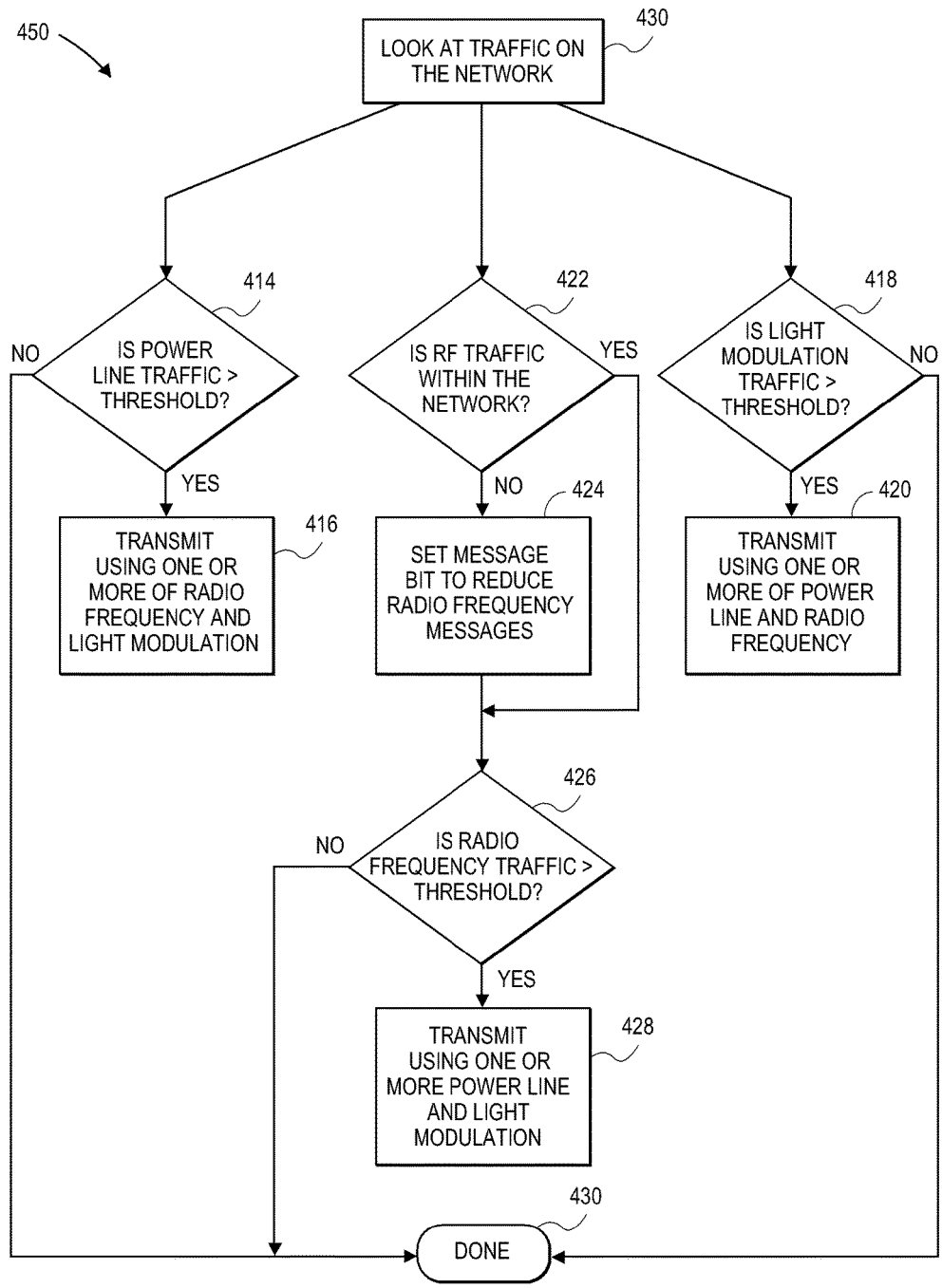
FIG. 4C illustrates a process to determine by which transmission medium to retransmit messages based on network traffic, according to certain embodiments.

FIG. 4C illustrates a process 450 to determine which transmission medium to retransmit messages based at least in part on network traffic. If the traffic on a particular physical layer is too great, messages on that physical layer will be delayed. Instead of retransmitting the message simultaneously on all of the physical layers, including the layer with too much traffic, the LED illumination device 200 transmits or retransmits the message using the others of the physical layers.

Further, in high density living areas, such as multi-dwelling units, the RF signals may propagate beyond the boundaries of the dwelling. Such situations may limit the number of radio frequency retransmissions and the LED illumination unit 200 intelligently forces the use of radio frequency and light modulation signaling.

Referring to FIG. 4C, at step 410, the process 450 looks at the message traffic on the communication network 100. At step 414, the powerline traffic is compared to a powerline traffic threshold. If the amount of message traffic on the network on the power line layer is greater than the threshold, the process 400 transmits or retransmits the message using one or more of RF signaling and light modulation signaling at step 416. If the threshold is not met, the process 450 finishes at step 430.

At step 418, the light modulation traffic is compared to a light modulation traffic threshold. If the amount of light modulation message traffic on the network is greater than the threshold, the process 450 transmits or retransmits the message using one or more of RF signaling and PL signaling at step 420. If the light modulation threshold is not met, the process 400 finishes at step 430.

At step 422, the process 450 determines if the majority of radio frequency message traffic is from devices with the network 100. In an embodiment, the process 400 determines whether majority of radio frequency message traffic is from devices with the network by comparing device addresses to a list of network device addresses.

If the radio frequency message traffic is from devices outside the network 100, then the LED devices 200 may also be transmitting to devices 200 outside of the network 100. At step 424, the process 450 reduces the number of messages transmitted using radio frequency signaling. In an embodiment, the process 450 sets a bit in the message data to reduce or stop radio frequency messaging.

If the majority of radio frequency message traffic is from devices within the network 100, the process 450 moves to step 426. At step 426, the radio frequency traffic is compared to a radio frequency traffic threshold. If the amount of radio frequency message traffic on the network is greater than the radio frequency traffic threshold, the process 450 transmits or retransmits the message using one or more of powerline signaling and light modulation signaling at step 428. If the radio frequency traffic threshold is not met, the process 450 finishes at step 430.

Thus, variations in the logic above could produce different signaling orders based on message traffic criteria. For example, if the threshold is exceeded for powerline traffic, the process could transmit the coded messages only via light modulation. If the threshold is exceeded for radio frequency traffic, the process 450 could transmit the coded messages only via power line. All permutations of power line, radio frequency, and light wave modulation signaling are possible.

FIG. 5 illustrates a process 500 to transmit messages to multiple recipient devices in a group within the communication network 100. Group membership is stored in a database in the device 200 following a previous enrollment process. At step 810 the device 200 first sends a Group Broadcast message intended for all members of a given group. The Message Type field in the Message Flags byte is set to signify a Group Broadcast message, and the To Address field is set to the group number, which can range from 0 to 255. The device 200 transmits the message using at least one of powerline, radio frequency, and light modulation. In an embodiment, the device 200 transmits the message using all of powerline, radio frequency, and light modulation.

Following the Group Broadcast message, the transmitting device 200 sends a Direct Group-cleanup message individually to each member of the group in its database. At step 815 the device 200 first sets the message To Address to that of the first member of the group, then it sends a Direct Group-cleanup message to that addressee at step 820. If Group-cleanup messages have been sent to every member of the group, as determined at step 825, transmission is finished at step 835. Otherwise, the device sets the message To Address to that of the next member of the group and sends the next Group-cleanup message to that addressee at step 820.

FIG. 6 illustrates a process 600 to transmit direct messages with retries to a device 200 within the communication network 100. Direct messages can be retried multiple times if an expected ACK is not received from the addressee. The process begins at step 910.

At step 915, the device 200 sends a Direct or a Direct Group-cleanup message to an addressee. At step 920 the device 200 waits for an Acknowledge message from the addressee. If at step 925 an Acknowledge message is received and it contains an ACK with the expected status, the process is finished at step 945.

If at step 925 an Acknowledge message is not received, or if it is not satisfactory, a Retry Counter is tested at step 930. If the maximum number of retries has already been attempted, the process fails at step 945. In an embodiment, devices 200 default to a maximum number of retries of five. If fewer than five retries have been tried at step 930 the device 200 increments its Retry Counter at step 935. At step 940 the device 200 will also increment the Max Hops field in the Message Flags byte, up to a maximum of three, in an attempt to achieve greater range for the message by retransmitting it more times by more devices. The message is sent again at step 915.

Figure 7:
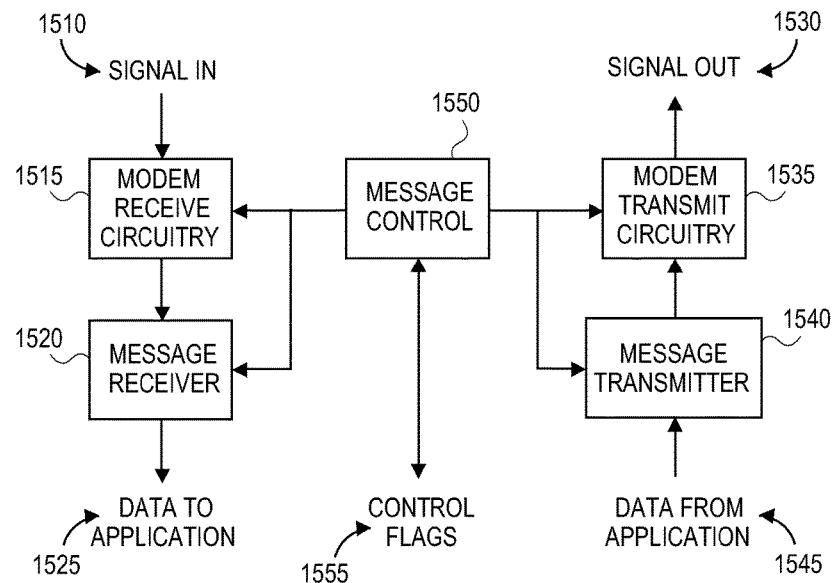
FIG. 7 is a block diagram of an LED illumination device illustrating the overall flow of information related to sending and receiving messages, according to certain embodiments.

The devices 200 comprise hardware and firmware that enable the devices 200 to send and receive messages. FIG. 7 is a block diagram of the LED illumination device 200 illustrating the overall flow of information related to sending and receiving messages. Received signals 1510 come from the powerline, via radio frequency, or via light modulation. Signal conditioning circuitry 1515 processes the raw signal and converts it into a digital bitstream. Message receiver firmware 1520 processes the bitstream as required and places the message payload data into a buffer 1525 which is available to the application running on the device 200. The message controller 1550 tells the application that data is available using control flags 1555.

To send a message, the application places message data in a buffer 1545, then tells the message controller 1550 to send the message using control flags 1555. The message transmitter firmware 1540 processes the message into a raw bitstream, which it feeds to the transmitter section of the modem 1535. The modem transmitter sends the bitstream as a powerline, radio frequency signal, or light modulation signal 1530.

Figure 8:
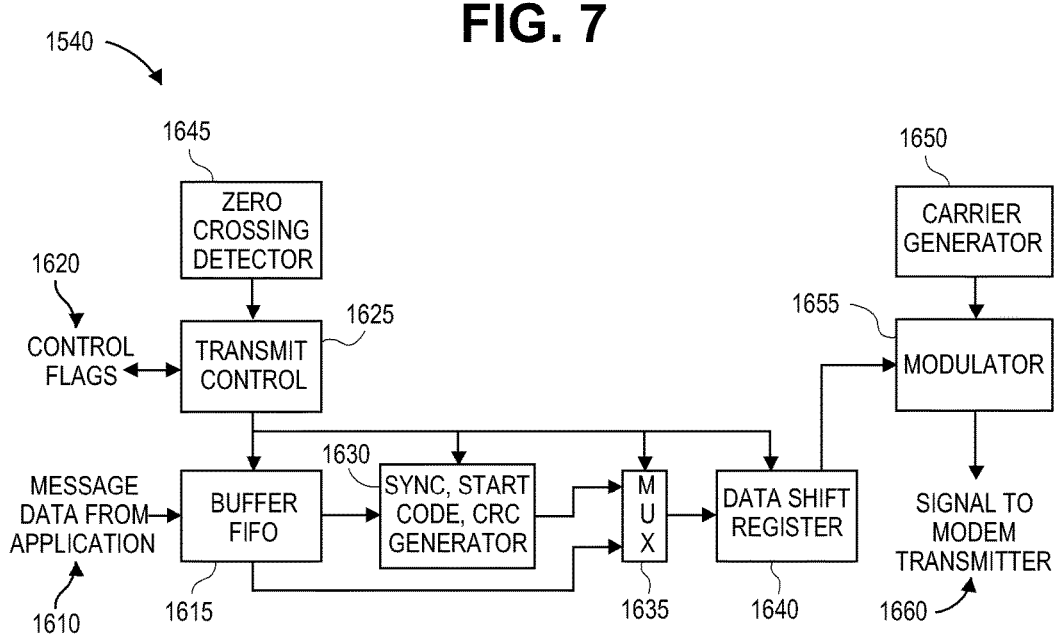
FIG. 8 is a block diagram illustrating the overall flow of information related to transmitting messages on the powerline, according to certain embodiments.

FIG. 8 shows message transmitter 1540 of FIG. 7 in greater detail and illustrates the device 200 sending a message on the powerline. The application first composes a message 1610 to be sent, excluding the CRC byte, and puts the message data in the transmit buffer 1615. The application then tells the transmit controller 1625 to send the message by setting appropriate control flags 1620. The transmit controller 1625 packetizes the message data by using multiplexer 1635 to put sync bits and a start code from generator 1630 at the beginning of a packet followed by data shifted out of the first-in first-out (FIFO) transmit buffer 1615.

As the message data is shifted out of FIFO 1615, a cyclic redundancy check (CRC) generator 1630 calculates the CRC byte, which is appended to the bitstream by multiplexer 1635 as the last byte in the last packet of the message. The bitstream is buffered in a shift register 1640 and clocked out in phase with the powerline zero crossings detected by zero crossing detector 1645. The BPSK modulator 1655 shifts the phase of the 131.65 KHz carrier from carrier generator 1650 by 180 degrees for zero-bits, and leaves the carrier unmodulated for one-bits. Note that the phase is shifted gradually over one carrier period as disclosed in conjunction with FIG. 11. Finally, the modulated carrier signal is applied to the powerline by the modem transmit circuitry 1535 of FIG. 7.

Figure 9:
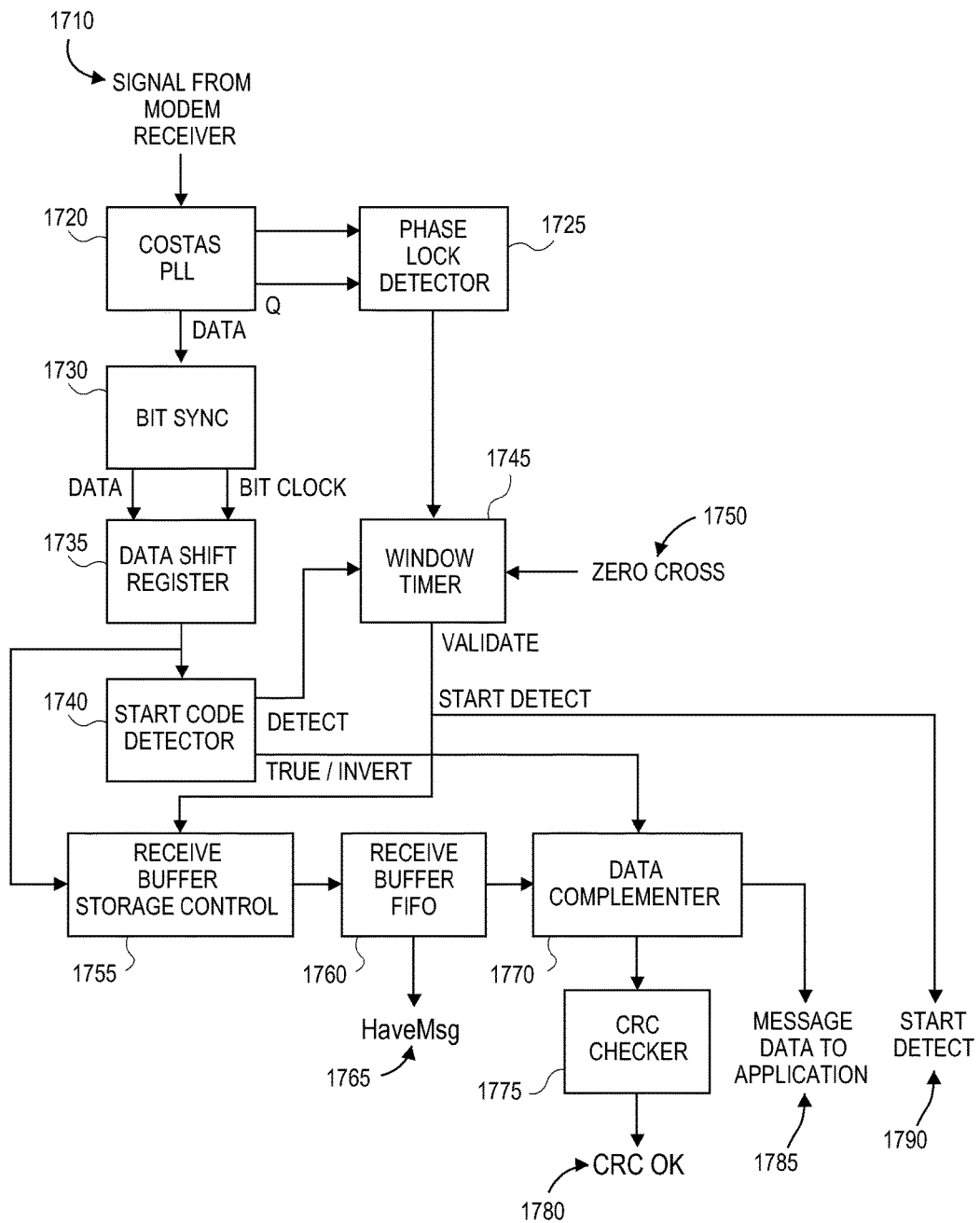
FIG. 9 is a block diagram illustrating the overall flow of information related to receiving messages from the powerline, according to certain embodiments.

FIG. 9 shows message receiver 1520 of FIG. 7 in greater detail and illustrates the device 200 receiving a message from the powerline. The modem receive circuitry 1515 of FIG. 7 conditions the signal on the powerline and transforms it into a digital data stream that the firmware in FIG. 9 processes to retrieve messages. Raw data 1710 from the powerline is typically very noisy, because the received signal can have an amplitude as low as a only few millivolts, and the powerline often carries high-energy noise spikes or other noise of its own. Therefore, in a preferred embodiment, a Costas phase locked loop (PLL) 1720, implemented in firmware, is used to find the BPSK signal within the noise. Costas PLLs, well known in the art, phase-lock to a signal both in phase and in quadrature. The phase-lock detector 1725 provides one input to the window timer 1745, which also receives a zero crossing signal 1750 and an indication that a start code in a packet has been found by start code detector 1740.

Whether it is phase-locked or not, the Costas PLL 1720 sends data to the bit sync detector 1730. When the sync bits of alternating ones and zeros at the beginning of a packet arrive, the bit sync detector 1730 will be able to recover a bit clock, which it uses to shift data into data shift register 1735. The start code detector 1740 looks for the start code following the sync bits and outputs a detect signal to the window timer 1745 after it has found one. The window timer 1745 determines that a valid packet is being received when the data stream begins 800 microseconds before the powerline zero.

FIG. 10 illustrates an exemplary 131.65 KHz powerline carrier signal with alternating BPSK bit modulation. Each bit uses ten cycles of carrier. Bit 1110, interpreted as a one, begins with a positive-going carrier cycle. Bit 2 1120, interpreted as a zero, begins with a negative-going carrier cycle. Bit 3 1130, begins with a positive-going carrier cycle, so it is interpreted as a one. Note that the sense of the bit interpretations is arbitrary. That is, ones and zeros could be reversed as long as the interpretation is consistent. Phase transitions only occur when a bitstream changes from a zero to a one or from a one to a zero. A one followed by another one, or a zero followed by another zero, will not cause a phase transition. This type of coding is known as NRZ, or nonreturn to zero.

FIG. 10 shows abrupt phase transitions of 180 degrees at the bit boundaries 1115 and 1125. Abrupt phase transitions introduce troublesome high-frequency components into the signal's spectrum. Phase-locked detectors can have trouble tracking such a signal. To solve this problem, the powerline encoding process uses a gradual phase change to reduce the unwanted frequency components.

FIG. 11 illustrates the powerline BPSK signal of FIG. 10 with gradual phase shifting of the transitions. The transmitter introduces the phase change by inserting 1.5 cycles of carrier at 1.5 times the 131.65 KHz frequency. Thus, in the time taken by one cycle of 131.65 KHz, three half-cycles of carrier will have occurred, so the phase of the carrier is reversed at the end of the period due to the odd number of half-cycles. Note the smooth transitions 1115 and 1125.

In an embodiment, the powerline packets comprise 24 bits. Since a bit takes ten cycles of 131.65 KHz carrier, there are 240 cycles of carrier in a packet, meaning that a packet lasts 1.823 milliseconds. The powerline environment is notorious for uncontrolled noise, especially high-amplitude spikes caused by motors, dimmers and compact fluorescent lighting. This noise is minimal during the time that the current on the powerline reverses direction, a time known as the powerline zero crossing. Therefore, the packets are transmitted near the zero crossing.

Figure 12:
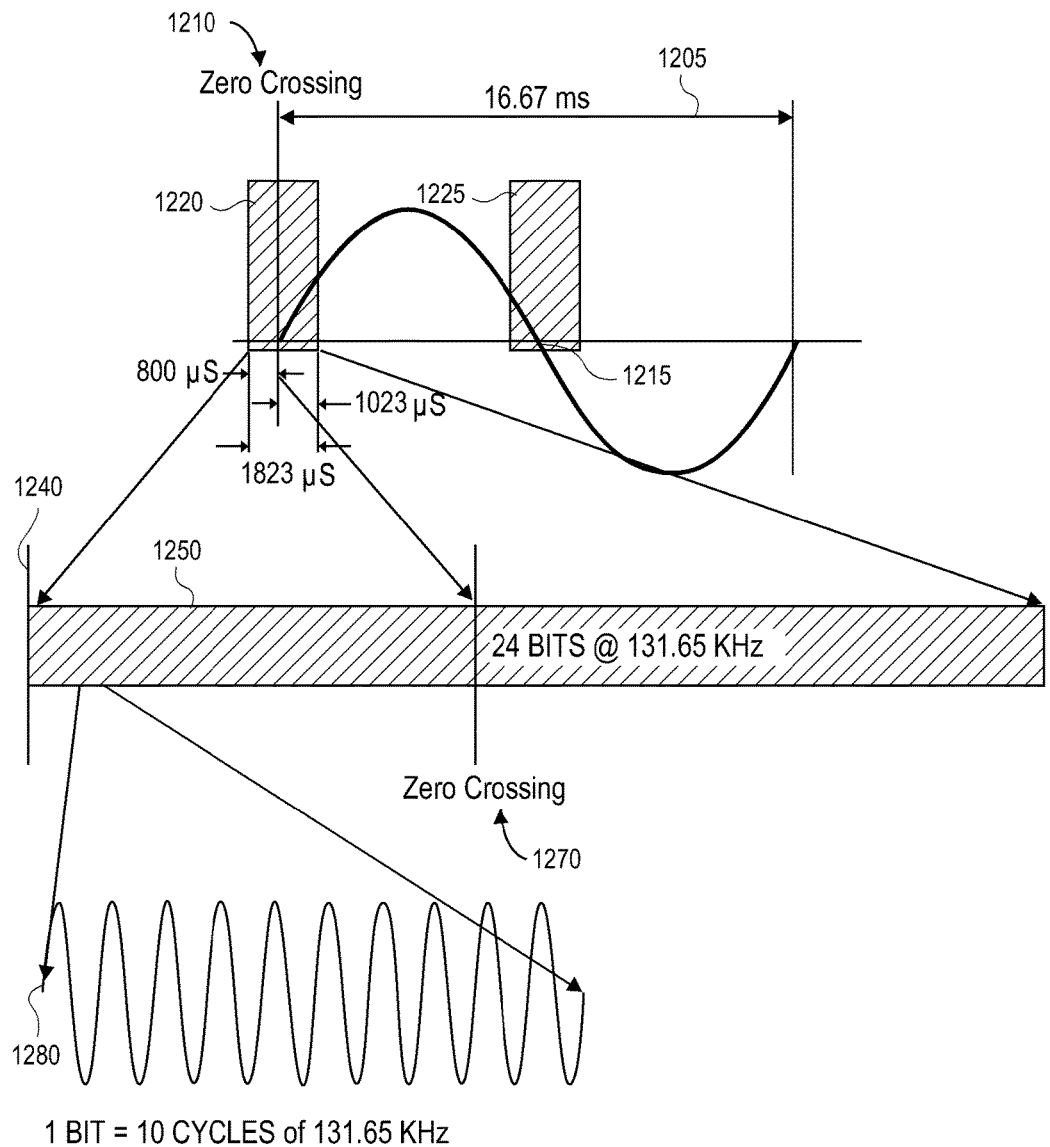
FIG. 12 illustrates powerline signaling applied to the powerline, according to certain embodiments.

FIG. 12 illustrates powerline signaling applied to the power line. Powerline cycle 1205 possesses two zero crossings 1210 and 1215. A packet 1220 is at zero crossing 1210 and a second packet 1225 is at zero crossing 1215. In an embodiment, the packets 1210, 1215 begin 800 microseconds before a zero crossing and last until 1023 microseconds after the zero crossing.

In some embodiments, the powerline transmission process waits for one or two additional zero crossings after sending a message to allow time for potential RF retransmission of the message by devices 200.

Figure 13:
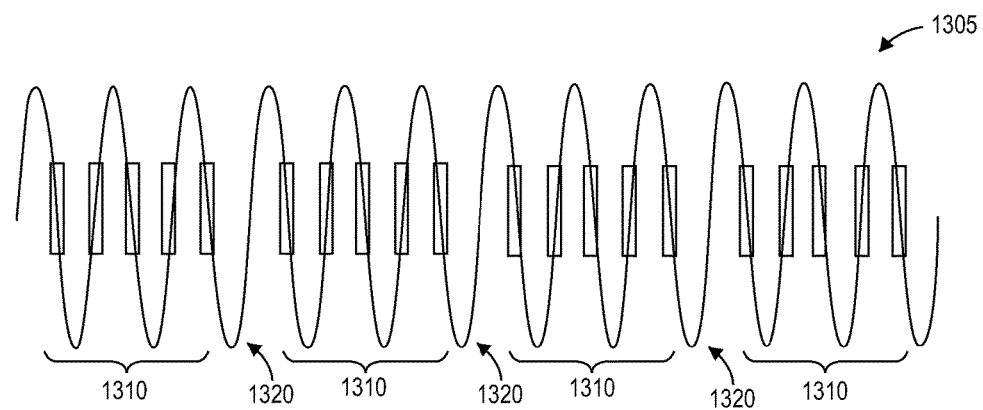
FIG. 13 illustrates standard message packets applied to the powerline, according to certain embodiments.
Figure 14:
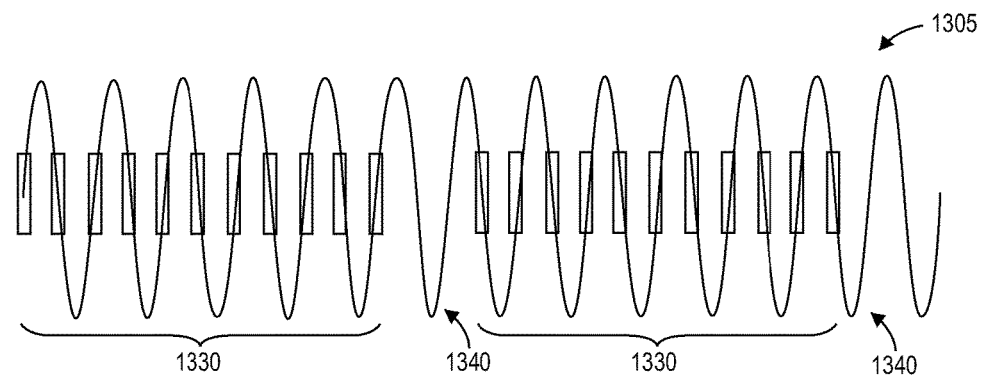
FIG. 14 illustrates extended message packets applied to the powerline, according to certain embodiments.

FIG. 13 illustrates an exemplary series of five-packet standard messages 1310 being sent on the powerline signal 1305. In an embodiment, the powerline transmission process waits for at least one zero crossing 1320 after each standard packet before sending another packet. FIG. 14 illustrates an exemplary series of eleven-packet extended messages 1330 being sent on the powerline signal 1305. In another embodiment, the powerline transmission process waits for at least two zero crossings 1340 after each extended packet before sending another packet. In other embodiments, the powerline transmission process does not wait for extra zero crossings before sending another packet.

In some embodiments, standard messages contain 120 raw data bits and use six zero crossings, or 50 milliseconds to send. In some embodiments, extended messages contain 264 raw data bits and use thirteen zero crossings, or 108.33 milliseconds to send. Therefore, the actual raw bitrate is 2,400 bits per second for standard messages, and 2,437 bits per second for extended messages, instead of the 2880 bits per second the bitrate would be without waiting for the extra zero crossings.

In some embodiments, standard messages contain 9 bytes (72 bits) of usable data, not counting packet sync and start code bytes, nor the message CRC byte. In some embodiments, extended messages contain 23 bytes (184 bits) of usable data using the same criteria. Therefore, the bitrates for usable data are further reduced to 1440 bits per second for standard messages and 1698 bits per second for extended messages. Counting only the 14 bytes (112 bits) of User Data in extended messages, the User Data bitrate is 1034 bits per second.

The LED devices 200 can send and receive the same messages that appear on the powerline using radio frequency signaling. Unlike powerline messages, however, messages sent by radio frequency are not broken up into smaller packets sent at powerline zero crossings, but instead are sent whole. As with power line, in an embodiment, there are two radio frequency message lengths: standard 10-byte messages and extended 24-byte messages.

Figure 15:
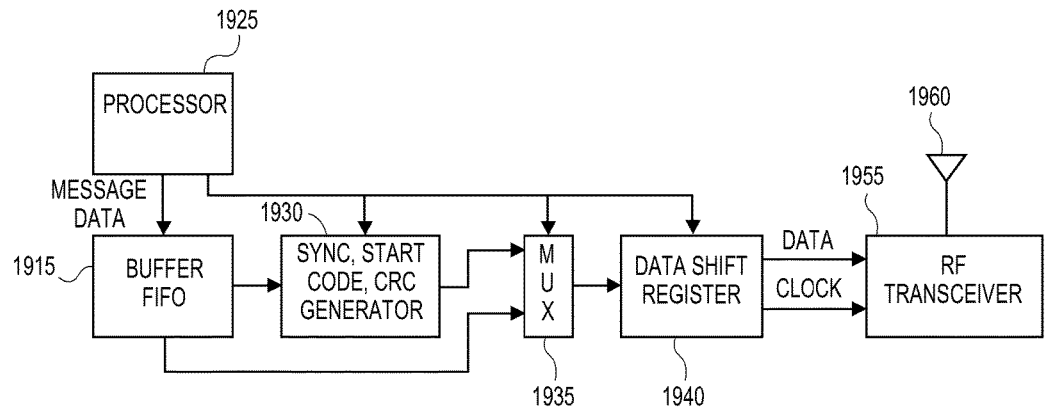
FIG. 15 is a block diagram illustrating the overall flow of information related to transmitting messages via RF, according to certain embodiments.

FIG. 15 is a block diagram illustrating the device 200 transmitting a message using radio frequency signaling. The steps are similar to those for sending powerline messages in FIG. 8, except that radio frequency messages are sent all at once in a single packet. In FIG. 15, processor 1925 composes a message to send, excluding the CRC byte, and stores the message data into transmit buffer 1915. The processor 1925 uses multiplexer 1935 to add sync bits and a start code from generator 1930 at the beginning of the radio frequency message followed by data shifted out of the first-in first-out (FIFO) transmit buffer 1915.

As the message data is shifted out of FIFO 1915, a CRC generator 1930 calculates the CRC byte, which is appended to the bitstream by multiplexer 1935 as the last byte of the message. The bitstream is buffered in a shift register 1940 and clocked out to the RF transceiver 1955. The RF transceiver 1955 generates an RF carrier, translates the bits in the message into Manchester-encoded symbols, FM modulates the carrier with the symbol stream, and transmits the resulting RF signal using antenna 1960. In a preferred embodiment, the RF transceiver 1955 is a single-chip hardware device and the other blocks in the figure are implemented in firmware running on the processor 1925.

Figure 16:
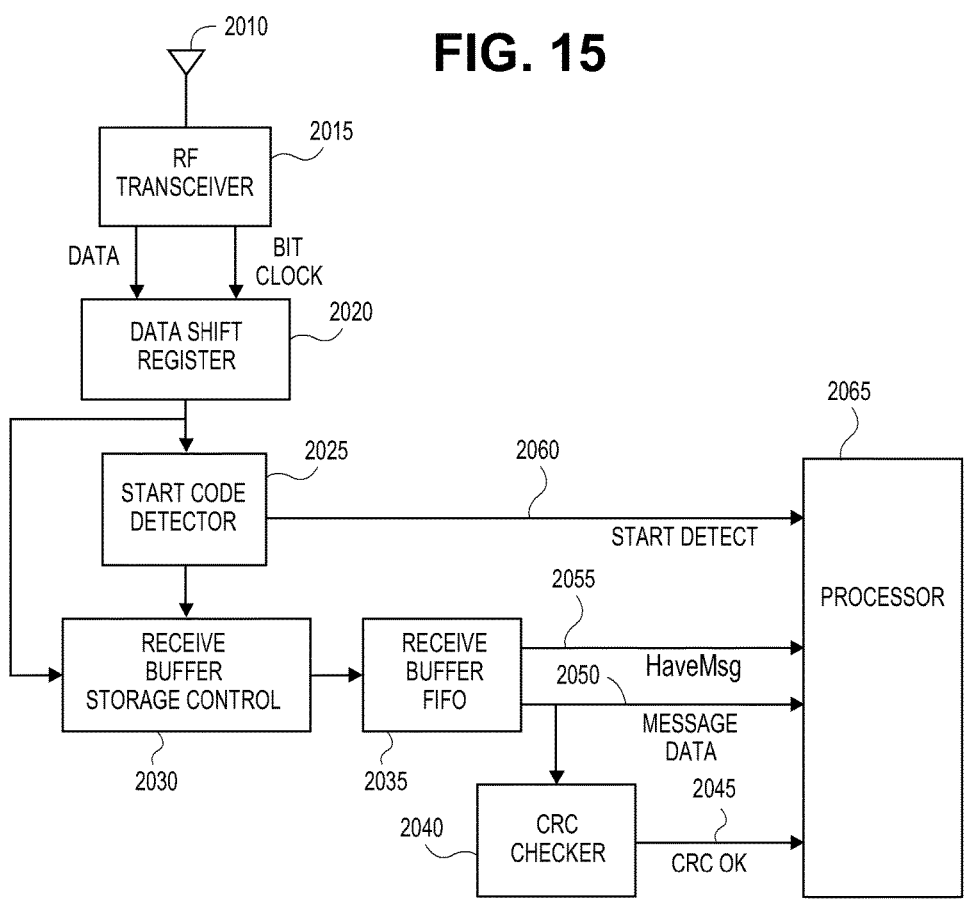
FIG. 16 is a block diagram illustrating the overall flow of information related to receiving messages via RF, according to certain embodiments.

FIG. 16 is a block diagram illustrating the device 200 receiving a message from the radio frequency signaling. The steps are similar to those for receiving powerline messages given in FIG. 9, except that radio frequency messages are sent all at once in a single packet. In FIG. 16, the RF transceiver 2015 receives an RF transmission from antenna 2010 and FM demodulates it to recover the baseband Manchester symbols. The sync bits at the beginning of the message allow the transceiver to recover a bit clock, which it uses to recover the data bits from the Manchester symbols. The transceiver outputs the bit clock and the recovered data bits to shift register 2020, which accumulates the bitstream in the message.

The start code detector 2025 looks for the start code following the sync bits at the beginning of the message and outputs a detect signal 2060 to the processor 2065 after it has found one. The start detect flag 2060 enables the receive buffer controller 2030 to begin accumulating message data from shift register 2020 into the FIFO receive buffer 2035. The storage controller 2030 insures that the FIFO 2035 only stores the data bytes in a message, and not the sync bits or start code. It stores 10 bytes for a standard message and 24 for an extended message, by inspecting the Extended Message bit in the Message Flags byte.

When the correct number of bytes has been accumulated, a HaveMsg flag 2055 is set to indicate a message has been received. The CRC checker 2040 computes a CRC on the received data and compares it to the CRC in the received message. If they match, the CRC OK flag 2045 is set. When the HaveMsg flag 2055 and the CRC OK flag 2045 are both set, the message data is ready to be sent to processor 2065. In a preferred embodiment, the RF transceiver 2015 is a single-chip hardware device and the other blocks in the figure are implemented in firmware running on the processor 2065.

FIG. 17 is a table 1700 of exemplary specifications for RF signaling within the communication network 100. In an embodiment, the center frequency lies in the band of approximately 902 to 924 MHz, which is permitted for non-licensed operation in the United States. In certain embodiments, the center frequency is approximately 915 MHz. Each bit is Manchester encoded, meaning that two symbols are sent for each bit. A one-symbol followed by a zero-symbol designates a one-bit, and a zero-symbol followed by a one-symbol designates a zero-bit.

Symbols are modulated onto the carrier using frequency-shift keying (FSK), where a zero-symbol modulates the carrier half the FSK deviation frequency downward and a one-symbol modulates the carrier half the FSK deviation frequency upward. The FSK deviation frequency is approximately 64 KHz. In other embodiments, the FSK deviation frequency is between approximately 100 KHz and 200 KHz. In other embodiments the FSK deviation frequency is less than 64 KHz. In further embodiment, the FSK deviation frequency is greater than 200 KHz. Symbols are modulated onto the carrier at 38,400 symbols per second, resulting in a raw data rata of half that, or 19,200 bits per second. The typical range for free-space reception is 150 feet, which is reduced in the presence of walls and other RF energy absorbers.

In other embodiments, other encoding schemes, such as return to zero (RZ), Nonreturn to Zero-Level (NRZ-L), Nonreturn to Zero Inverted (NRZI), Bipolar Alternate Mark Inversion (AMI), Pseudoternary, differential Manchester, Amplitude Shift Keying (ASK), Phase Shift Keying (PSK), and the like, could be used.

Devices 200 transmit data with the most-significant bit sent first. In an embodiment, RF messages begin with two sync bytes comprising AAAA in hexadecimal, followed by a start code byte of C3 in hexadecimal. Ten data bytes follow in standard messages, or twenty-four data bytes in extended messages. The last data byte in a message is a CRC over the data bytes as disclosed above.

It takes 5.417 milliseconds to send a 104-bit standard message, and 11.250 milliseconds to send a 216-bit extended message. Zero crossings on the powerline occur every 8.333 milliseconds, so a standard RF message can be sent during one powerline half-cycle and an extended RF message can be sent during two powerline half-cycles. The waiting times after sending powerline messages, as shown in FIGS. 13 and 14, are to allow sufficient time for devices 200 to retransmit a powerline message.

The LED devices 200 can send and receive the same messages that appear on the powerline and via RF using light modulation signaling. Unlike powerline messages, however, messages sent by light modulation are not broken up into smaller packets sent at powerline zero crossings, but instead are sent whole, similar to the messages sent by RF. As with powerline and RF, in an embodiment, there are two light modulation message lengths: standard 10-byte messages and extended 24-byte messages.

Figure 18:
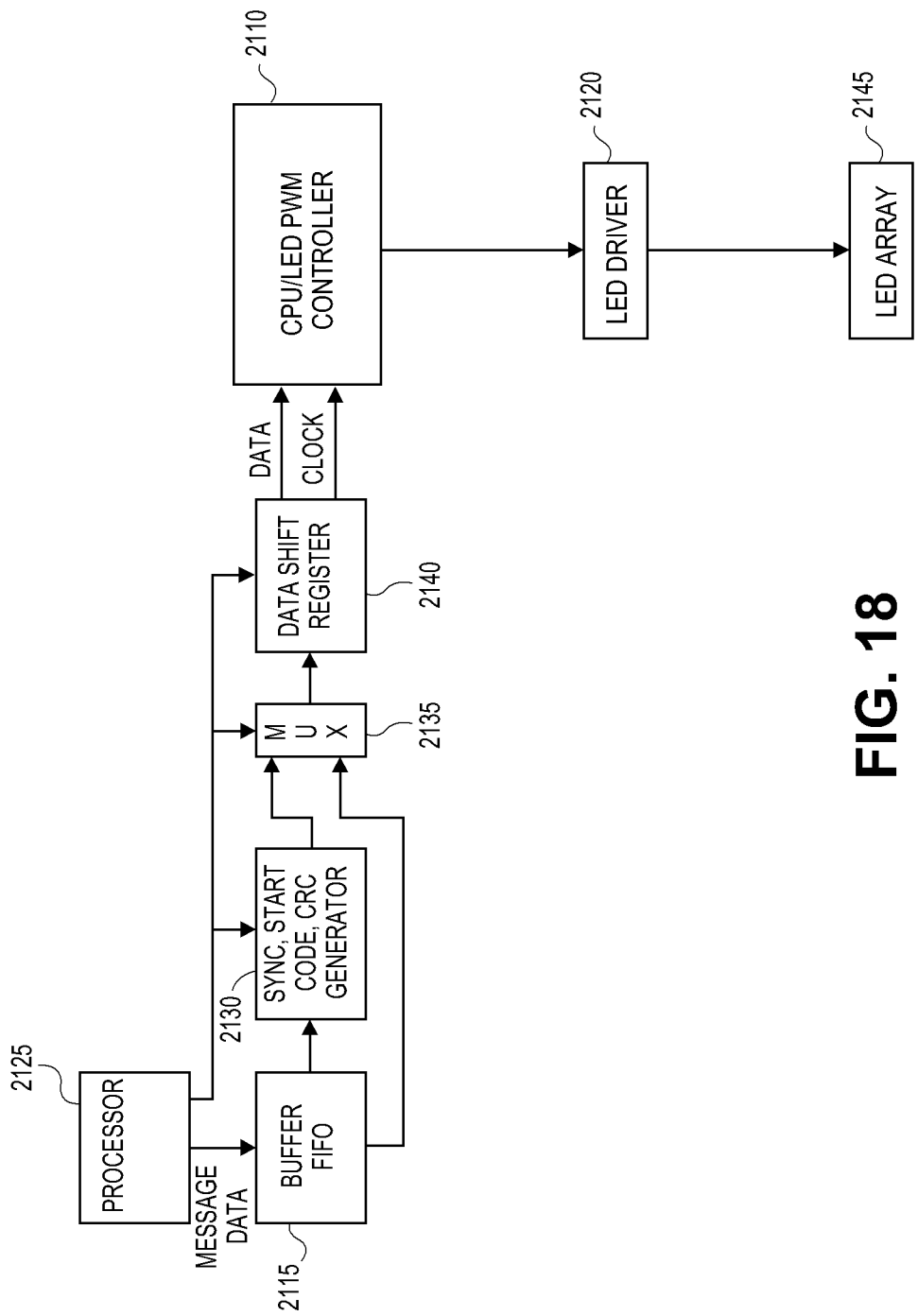
FIG. 18 is a block diagram illustrating the overall flow of information related to transmitting messages via modulation of light from an LED illumination device, according to certain embodiments.

FIG. 18 is a block diagram illustrating exemplary circuitry 201 to transmit messages via modulation of light from the LED illumination device 200. The steps for transmitting are similar to those for sending RF messages, in that the messages are sent all at once in a single packet.

Processor 2125 composes a message to send, excluding the CRC byte, and stores the message data into a transmit buffer 2115. The processor 2125 uses a multiplexer 1935 to add sync bits and a start code from a generator 2130 at the beginning of the light modulation message followed by data shifted out of a first-in first-out (FIFO) transmit buffer 2115.

As the message data is shifted out of the FIFO 2115, a CRC generator 2130 calculates the CRC byte, which is appended to the bitstream by the multiplexer 2135 as the last byte of the message. The bitstream is buffered in a shift register 2140 and clocked out to the LED driver 2120. In an embodiment, the LED driver 2120 pulse wave modulates the power signal to the LED array 2125. LED array 2125 emits pulse wave modulated light which includes the encoded message. In another embodiment, the controller 2110 and the LED driver 2120 BPSK encode the message onto a carrier signal, such as the carrier signal used for the power line signaling, and modulate the carrier signal onto the light emitted from the LED array 2145.

Figure 19:
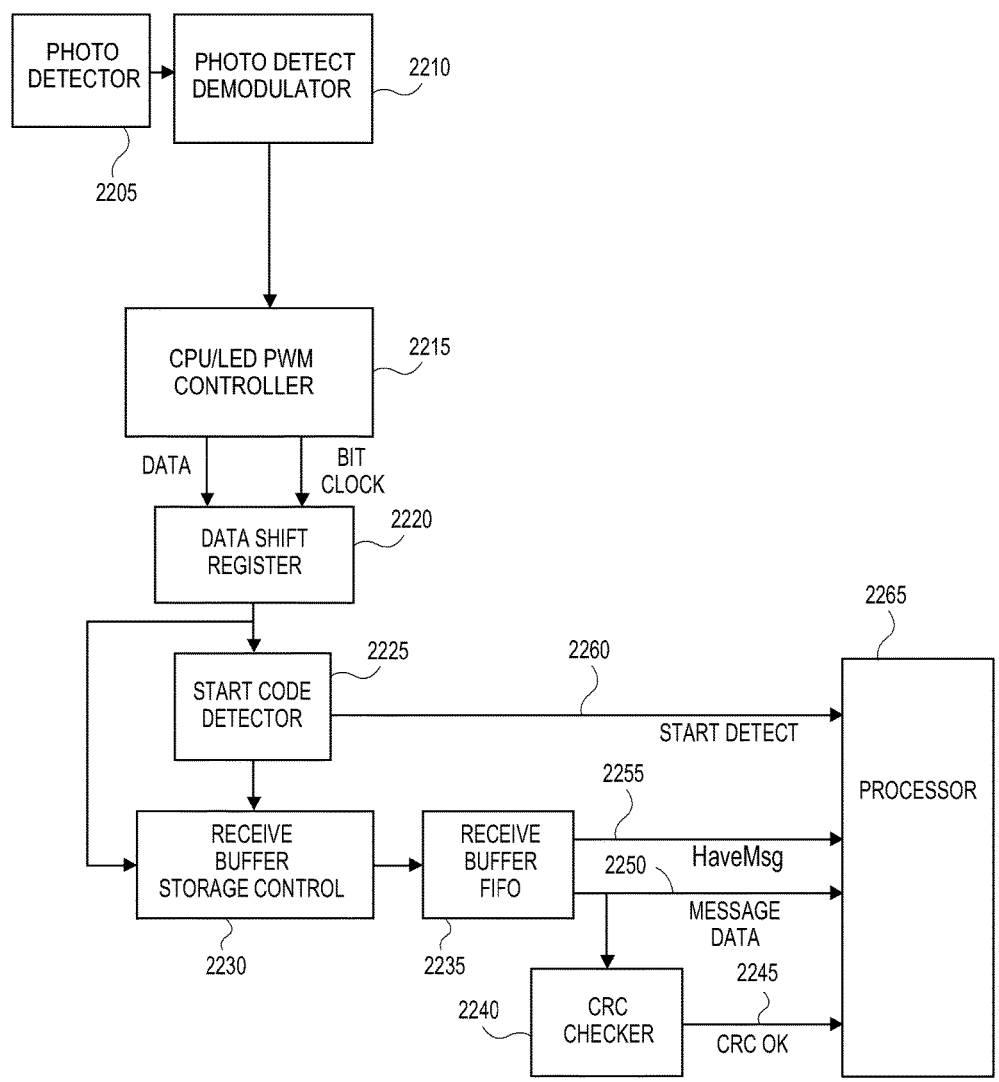
FIG. 19 is a block diagram illustrating the overall flow of information related to receiving messages via modulation of light from an LED illumination device, according to certain embodiments.

FIG. 19 is a block diagram illustrating exemplary circuitry 201 to receive messages via modulation of light from an LED illumination device 200. The steps for receiving are similar to those for sending RF messages, in that the messages are received all at once in a single packet.

Optical sensor 2205 receives data encoded modulated light and converts the data encoded modulated light to a modulated electrical signal which is received by a photo detector demodulator 2210. The photo detector demodulator 2210 demodulates the electrical signal to recover the data symbols.

Controller 2215 receives the bitstream. The sync bits at the beginning of the message allow the controller 2215 to recover a bit clock, which it uses to recover the data bits from the symbols. The controller 2215 outputs the bit clock and the recovered data bits to a shift register 2220, which accumulates the bitstream in the message.

Similar to the RF signaling circuitry, a start code detector 2225 looks for the start code following the sync bits at the beginning of the message and outputs a detect signal 2260 to the processor 2265 after it has found one. The start detect flag 2265 enables a receive buffer controller 2230 to begin accumulating message data from shift register 2220 into a FIFO receive buffer 2235. A storage controller 2230 insures that the FIFO 2235 only stores the data bytes in a message, and not the sync bits or start code. It stores 10 bytes for a standard message and 24 for an extended message, by inspecting the Extended Message bit in the Message Flags byte.

When the correct number of bytes has been accumulated, a HaveMsg flag 2255 is set to indicate a message has been received. A CRC checker 2240 computes a CRC on the received data and compares it to the CRC in the received message. If they match, a CRC OK flag 2245 is set. When the HaveMsg flag 2255 and the CRC OK flag 2265 are both set, the message data is ready to be sent to processor 2265.

Figure 20A:
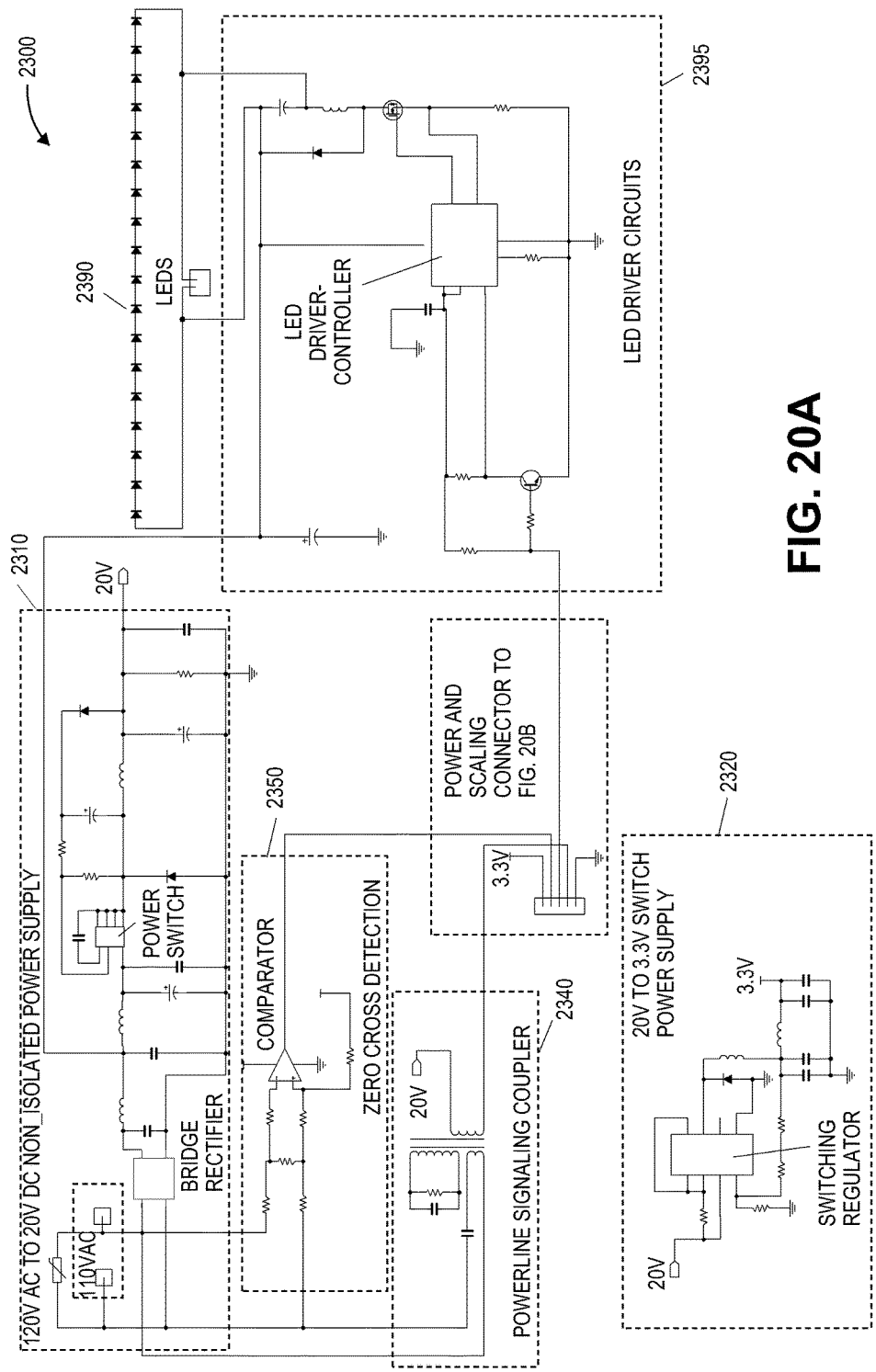
FIGS. 20A and 20B are an exemplary schematic diagram of an LED illumination device capable of transmitting and receiving messages over the communication network via powerline signaling, RF, and modulation of light, according to certain embodiments.
Figure 20B:
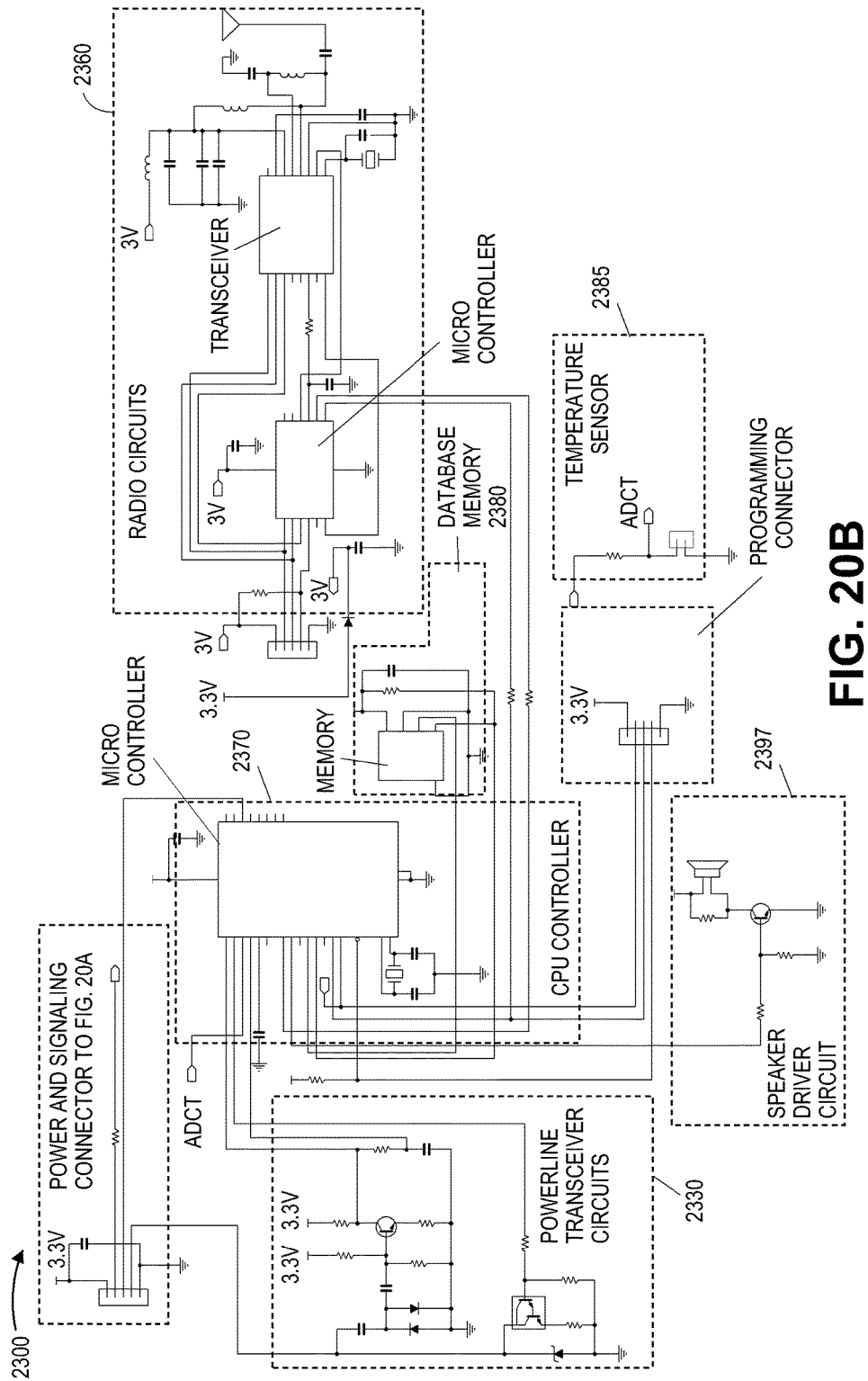

FIGS. 20A and 20B are an exemplary schematic diagram of an LED illumination device 2300 configured to transmit and receive messages over the communication network 100 via powerline signaling and RF signaling, and transmit modulated light encoded messages. In an embodiment, the one or more of the circuit stages and circuit elements of FIGS. 20A and 20B can be incorporated within the glass envelope of the illumination device 2300. In the illustrated embodiment, the illumination device 2300 comprises a power supply and power line communication (PLC) interface components.

The power supply comprises a 120 VAC to 20 V non-isolated power supply 2310 and a 20 V to 3.3 V switch power supply 2320 configured to generate voltages used by the circuitry and the LED array. The power supply 2310 comprises a bridge rectifier and a power switcher, such as, for example an MB4S from Fairchild Semiconductor, Inc. and a LNK306 from Power Integrations, Inc. respectively, and the like. The power supply 2320 comprises a buck boost switching regulator, such as, for example, MC33063ADR from Texas Instruments, Inc., and the like.

The power line communication (PLC) interface components comprise a powerline transceiver circuit 2330, a powerline switching coupler 2340, and a zero crossing detector 2350. The powerline transceiver circuit 2330 sends powerline data to the controller 2370. The powerline switching coupler 2340 receives the line voltage. In an embodiment, the powerline switching coupler 2340 comprises a transformer such as, for example, an intermediate frequency transformer IFT-7SB-4268-05-LF having coil ratios of approximately 11/213.5/64. The zero crossing detector 2350 detects the zero crossings of the line voltage. In an embodiment, the zero crossing detector 2350 comprises a comparator, such as, for example, a LMV321 by Texas Instruments, Inc., and the like.

The illumination device 2300 further comprises a radio circuit 2360, a CPU controller 2370 and memory 2380, an LED driver 2395, and an LED array 2390. The radio circuit 2360 provides the RF physical layer and transmits and receives RF encoded messages. In an embodiment, the radio circuit 2360 comprises a microcontroller and a transceiver, such as for example, a PIC16F688 and a MRF49XA-I/ST by Microchip Technology, Inc., and the like.

The CPU controller 2370 processes the transmit and the receive messages. In an embodiment, the CPU controller comprises a PIC18F25J10-I/ML by Microchip Technology, Inc., and the like. The memory 2380 associate with the controller 2370 can be, for example, ROM, RAM, EEPROM, EPROM, and the like, capable of storing data and programming. In an embodiment, the memory 2380 comprises, for example, a serial EEPROM 24LC32AI/SN by Microchip Technology, Inc., and the like.

The LED driver 2395 receives message data from the controller 2370 drives the LED array 2390 to transmit modulated light with the encoded message. In an embodiment, the LED driver comprises, for example, an AL9910 by Diodes, Inc., and the like. The LED array 2390 comprises one or more LEDs, such as for example, and the like.

The LED lighting module 200 optionally comprises a temperature sensor 2385 and a speaker circuit 2397. In an embodiment, the temperature sensor 2385 can be used to monitor the temperature of the device circuitry such that the controller 2370 shuts off the LEDs when the temperature is too hot. In an embodiment, the speaker 2397 can be used to notify users of overheating, to provide feedback, such as when a link with another device is established, and the like.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of certain embodiments is not intended to be exhaustive or to limit the invention to the precise form disclosed above. While specific embodiments of, and examples for, the invention are described above for illustrative purposes, various equivalent modifications are possible within the scope of the invention, as those ordinary skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A multi-media communication device capable of reacting to and retransmitting messages, the multi-media communication device comprising:
receiving circuitry configured to receive coded messages on a first communication medium comprising radio signals in free space and on a second communication medium comprising electrically conducted signals by wire;
transmitting circuitry configured to transmit the coded messages on the first communication medium and on the second communication medium; and
processing circuitry configured to determine whether a first received coded message is received on the first communication medium and on the second communication medium in a first time slot and to synchronize retransmissions of the first received coded message on the first communication medium and on the second communication medium in a second time slot when the first received coded message is not received on both of the first communication medium and on the second communication medium in the first time slot.

2. The multi-media communication device of claim 1 wherein the second time slot is a next time slot after the first time slot.

3. The multi-media communication device of claim 1 wherein the processing circuitry is further configured to determine whether an acknowledgement of the first received coded message by an intended recipient has been received after retransmitting the first received coded message.

4. The multi-media communication device of claim 1 wherein synchronizing retransmissions of the first received coded message on the first communication medium and on the second communication medium comprises retransmitting in a synchronized time slot on the first communication medium and on the second communication medium.

5. The multi-media communication device of claim 1 further comprising light wave modulation/demodulation circuitry configured to receive and transmit the coded messages using the light wave propagated signals in free space.

6. The multi-media communication device of claim 1 further comprising an enclosure configured to enclose the receiving circuitry, the transmitting circuitry, and the processing circuitry.

7. The multi-media communication device of claim 6 wherein the enclosure comprises a bulb and a base, the receiving circuitry, the transmitting circuitry, and the processing circuitry disposed within the base.

8. A method of reacting to and retransmitting messages, the method comprising:
   receiving coded messages with electrical circuitry on a first communication medium comprising radio signals in free space and on a second communication medium comprising electrically conducted signals by wire;
   determining with the electrical circuitry whether a first received coded message is received on the first communication medium and on the second communication medium in a first time slot;
   synchronizing with the electrical circuitry retransmissions of the first received coded message on the first communication medium and on the second communication medium when the first received coded message is not received on both of the first communication medium and on the second communication medium in the first time slot; and
   synchronously retransmitting with the electrical circuitry the first received coded message on the first communication medium and on the second communication medium in a second time slot.

9. The method of claim 8 wherein the second time slot is a next time slot after the first time slot.

10. The method of claim 8 further comprising determining whether an acknowledgement of the first received coded message by an intended recipient has been received after retransmitting the first received coded message.

11. The method of claim 8 wherein synchronously retransmitting the first received coded message on the first communication medium and on the second communication medium comprises retransmitting in a synchronized time slot on the first communication medium and on the second communication medium.

12. The method of claim 8 further comprising receiving and transmitting the coded messages with light wave modulation/demodulation circuitry on a third communication medium comprising light wave propagated signals in free space.

13. The method of claim 8 further comprising enclosing the electrical circuitry in an enclosure.

14. The method of claim 13 wherein the enclosure comprises a bulb and a base, the electrical circuitry disposed within the base.

15. A system to react to and retransmit messages, the system comprising:
   a mesh network configured to transmit and receive coded messages using powerline signaling and radio frequency (RF) signaling, the powerline signaling comprising message data modulated onto a carrier signal and the modulated carrier signal added to a powerline waveform, the RF signaling comprising the message data modulated onto an RF signal;
   a first multi-media communication device comprising first receiving circuitry configured to receive the coded messages using the RF signaling and the powerline signaling, first transmitting circuitry configured to transmit the coded messages using the RF signaling and the powerline signaling, and first processing circuitry configured to determine whether a first received coded message is received using the RF signaling and the powerline signaling in a first time slot and to synchronize retransmissions of the first received coded message using the RF signaling and the powerline signaling for retransmission in a second time slot; and
   a second multi-media communication device comprising second receiving circuitry configured to receive the coded messages using the RF signaling and the powerline signaling, second transmitting circuitry configured to transmit the coded messages using the RF signaling and the powerline signaling, and second processing circuitry configured to determine whether the first received coded message is received using the RF signaling and the powerline signaling in the first time slot and to synchronize retransmissions of the first received coded message using the RF signaling and the powerline signaling for retransmission in the second time slot.

16. The system of claim 15 wherein the second time slot is a next time slot after the first time slot.

17. The system of claim 15 wherein synchronizing retransmissions of the first received coded message using the RF signaling and the powerline signaling comprises retransmitting in a synchronized time slot on the first communication medium and on the second communication medium.

18. The system of claim 15 wherein the first multi-media communication device further comprises light wave modulation/demodulation circuitry configured to receive and transmit the coded messages using the light wave propagated signals in free space.

19. The system of 15 wherein the first multi-media communication device further comprises a bulb and a base, the first receiving circuitry, the first transmitting circuitry, and the first processing circuitry disposed within the base.

* * * * *

UNITED STATES PATENT AND TRADEMARK OFFICE
CERTIFICATE OF CORRECTION

PATENT NO. : 10,181,902 B2
APPLICATION NO. : 15/808356
DATED : January 15, 2019
INVENTOR(S) : Daniel Brian Cregg et al.

Page 1 of 1

It is certified that error appears in the above-identified patent and that said Letters Patent is hereby corrected as shown below:

In the Specification

Column 6, Line 56, change "8,081649" to --8,081,649--.

In the Claims

Column 24, Line 47 (approx.), in Claim 19, change "of" to --of claim--.

Signed and Sealed this
Thirtieth Day of April, 2019

Andrei Iancu
*Director of the United States Patent and Trademark Office*